(12) United States Patent
Niu et al.

(10) Patent No.: US 12,174,351 B2
(45) Date of Patent: Dec. 24, 2024

(54) OPTICAL IMAGING LENS ASSEMBLY

(71) Applicant: ZHEJIANG SUNNY OPTICS CO., LTD., Zhejiang (CN)

(72) Inventors: Le Niu, Zhejiang (CN); Xiaobin Zhang, Zhejiang (CN); Jianke Wenren, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 542 days.

(21) Appl. No.: 17/572,665

(22) Filed: Jan. 11, 2022

(65) Prior Publication Data
US 2022/0221693 A1   Jul. 14, 2022

(30) Foreign Application Priority Data

Jan. 14, 2021 (CN) .......................... 202110049088.6

(51) Int. Cl.
*G02B 13/00* (2006.01)
*G02B 9/64* (2006.01)
(52) U.S. Cl.
CPC ........... *G02B 13/0045* (2013.01); *G02B 9/64* (2013.01)

(58) Field of Classification Search
CPC .............................. G02B 13/0045; G02B 9/64
USPC .......................................................... 359/708
See application file for complete search history.

(56) References Cited

FOREIGN PATENT DOCUMENTS

| CN | 111007637 A | 4/2020 | |
|---|---|---|---|
| CN | 111352219 A | 6/2020 | |
| CN | 112130292 A | 12/2020 | |
| WO | WO-2019233160 A1 * | 12/2019 | ......... G02B 13/0045 |

* cited by examiner

*Primary Examiner* — Wyatt A Stoffa
*Assistant Examiner* — Grant A Gagnon
(74) *Attorney, Agent, or Firm* — Samson G. Yu

(57) ABSTRACT

The disclosure provides an optical imaging lens assembly, which sequentially includes, from an object side to an image side along an optical axis, a first lens, a second lens, a third lens, a fourth lens, a fifth lens, a sixth lens, a seventh lens and an eighth lens with refractive power respectively. An image-side surface of the eighth lens is a convex surface. TTL is a distance from an object-side surface of the first lens to an imaging surface of the optical imaging lens assembly on the optical axis, ImgH is a half of a diagonal length of an effective pixel region on the imaging surface of the optical imaging lens assembly, and TTL and ImgH meet TTL/ImgH<1.2. An effective focal length f8 of the eighth lens and a curvature radius R16 of the image-side surface of the eighth lens meet 0.5<f8/R16<1.5.

16 Claims, 14 Drawing Sheets longitudinal aberration curve longitudinal aberration curve

OPTICAL IMAGING LENS ASSEMBLY

CROSS-REFERENCE TO RELATED APPLICATION(S)

The disclosure claims priority to and the benefit of Chinese Patent Application No. 202110049088.6, filed in the China National Intellectual Property Administration (CNIPA) on 14 Jan. 2021, which is incorporated herein by reference in its entirety.

TECHNICAL FIELD

The disclosure relates to the field of optical elements, and particularly to an optical imaging lens assembly.

BACKGROUND

With the rapid development of sciences and technologies, portable electronic products such as smart phones, computers and tablet computers have been gradually developed, and users have made increasingly strict requirements on imaging functions of portable electronic products such as smart phones. Meanwhile, imaging lens assemblies in smart phones have also gradually tended to be miniaturized to adapt to a development trend of miniaturization of smart phones, which brings greater challenges to the machining and assembling of lens assemblies. In addition, requirements of users on high performance of ultra-wide angle, great focal length, large aperture, large image surface and the like of smart phones have also increased.

How to endow a lens assembly with the characteristics of large image surface and the like to achieve a better shooting range and shooting effect on the basis of ensuring the miniaturization of the lens assembly is one of problems urgent to be solved by many lens designers at present.

SUMMARY

An embodiment of the disclosure provides an optical imaging lens assembly, which sequentially includes, from an object side to an image side along an optical axis, a first lens, a second lens, a third lens, a fourth lens, a fifth lens, a sixth lens, a seventh lens and an eighth lens with refractive power respectively. An image-side surface of the eighth lens is a convex surface. TTL is a distance from an object-side surface of the first lens to an imaging surface of the optical imaging lens assembly on the optical axis, ImgH is a half of a diagonal length of an effective pixel region on the imaging surface of the optical imaging lens assembly, and TTL and ImgH may meet TTL/ImgH<1.2. An effective focal length f8 of the eighth lens and a curvature radius R16 of the image-side surface of the eighth lens may meet 0.5<f8/R16<1.5.

In an implementation mode, the object-side surface of the first lens to the image-side surface of the eighth lens include at least one aspheric mirror surface.

In an implementation mode, a curvature radius R5 of an object-side surface of the third lens, a curvature radius R6 of an image-side surface of the third lens, a curvature radius R13 of an object-side surface of the seventh lens and a curvature radius R14 of an image-side surface of the seventh lens may meet 0.5<(R6−R5)/(R13+R14)<1.5.

In an implementation mode, a curvature radius R7 of an object-side surface of the fourth lens and a curvature radius R11 of an object-side surface of the sixth lens may meet 0.5<R7/(R7−R11)<1.0.

In an implementation mode, a spacing distance T67 of the sixth lens and the seventh lens on the optical axis and a spacing distance T78 of the seventh lens and the eighth lens on the optical axis may meet 0<T67/T78<0.6.

In an implementation mode, an effective focal length f1 of the first lens, an effective focal length f2 of the second lens, an effective focal length f3 of the third lens and an effective focal length f5 of the fifth lens may meet −1.3<(f1+f3)/(f2+f5)<−0.3.

In an implementation mode, a total effective focal length f of the optical imaging lens assembly and an effective focal length f6 of the sixth lens may meet 0<f/f6<1.0.

In an implementation mode, a curvature radius R1 of the object-side surface of the first lens, a curvature radius R2 of an image-side surface of the first lens, a curvature radius R3 of an object-side surface of the second lens and a curvature radius R4 of an image-side surface of the second lens may meet 0.3<(R2−R1)/(R3−R4)<1.3.

In an implementation mode, a curvature radius R10 of an image-side surface of the fifth lens, a maximum effective radius DT51 of an object-side surface of the fifth lens and a maximum effective radius DT52 of the image-side surface of the fifth lens may meet 0<(DT51+DT52)/R10<1.0.

In an implementation mode, a combined focal length f1234 of the first lens, the second lens, the third lens and the fourth lens and a combined focal length f78 of the seventh lens and the eighth lens may meet −1.5<f1234/f78<−0.5.

In an implementation mode, an edge thickness ET2 of the second lens, an edge thickness ET7 of the seventh lens and an edge thickness ET8 of the eighth lens may meet 0.5<ET8/(ET2+ET7)<1.0.

In an implementation mode, a maximum effective radius DT21 of an object-side surface of the second lens, a maximum effective radius DT22 of an image-side surface of the second lens, a maximum effective radius DT61 of an object-side surface of the sixth lens and a maximum effective radius DT62 of an image-side surface of the sixth lens may meet 0.3<(DT21+DT22)/(DT61+DT62)<0.8.

In an implementation mode, a maximum effective radius DT71 of an object-side surface of the seventh lens and a maximum effective radius DT82 of an image-side surface of the eighth lens may meet 0.3<DT71/DT82<0.8.

In an implementation mode, the fifth lens has a negative refractive power, and an image-side surface thereof is a concave surface.

In an implementation mode, Semi-FOV is a half of a maximum field of view of the optical imaging lens assembly, and a total effective focal length f of the optical imaging lens assembly and Semi-FOV may meet f×tan(Semi-FOV)>6.5 mm.

In an implementation mode, $\Sigma CT$ is a sum of center thicknesses of the first lens to the eighth lens on the optical axis, $\Sigma AT$ is a sum of spacing distances of any two adjacent lenses in the first lens to the eighth lens on the optical axis, and $\Sigma CT$ and $\Sigma AT$ may meet $0.8<\Sigma CT/\Sigma AT<1.5$.

Another aspect of the disclosure provides an optical imaging lens assembly, which sequentially includes, from an object side to an image side along an optical axis, a first lens, a second lens, a third lens, a fourth lens, a fifth lens, a sixth lens, a seventh lens and an eighth lens with refractive power respectively. The fifth lens has a negative refractive power, and an image thereof is a concave surface. An image-side surface of the eighth lens is a convex surface. TTL is a distance from an object-side surface of the first lens to an imaging surface of the optical imaging lens assembly on the optical axis, ImgH is a half of a diagonal length of an effective pixel region on the imaging surface of the optical imaging lens assembly, and TTL and ImgH may meet TTL/ImgH<1.2.

In an implementation mode, a curvature radius R5 of an object-side surface of the third lens, a curvature radius R6 of an image-side surface of the third lens, a curvature radius R13 of an object-side surface of the seventh lens and a curvature radius R14 of an image-side surface of the seventh lens may meet 0.5<(R6−R5)/(R13+R14)<1.5.

In an implementation mode, a curvature radius R7 of an object-side surface of the fourth lens and a curvature radius R11 of an object-side surface of the sixth lens may meet 0.5<R7/(R7−R11)<1.0.

In an implementation mode, a spacing distance T67 of the sixth lens and the seventh lens on the optical axis and a spacing distance T78 of the seventh lens and the eighth lens on the optical axis may meet 0<T67/T78<0.6.

In an implementation mode, an effective focal length f1 of the first lens, an effective focal length f2 of the second lens, an effective focal length f3 of the third lens and an effective focal length f5 of the fifth lens may meet −1.3<(f1+f3)/(f2+f5)<−0.3.

In an implementation mode, a total effective focal length f of the optical imaging lens assembly and an effective focal length f6 of the sixth lens may meet 0<f/f6<1.0.

In an implementation mode, a curvature radius R1 of the object-side surface of the first lens, a curvature radius R2 of an image-side surface of the first lens, a curvature radius R3 of an object-side surface of the second lens and a curvature radius R4 of an image-side surface of the second lens may meet 0.3<(R2−R1)/(R3−R4)<1.3.

In an implementation mode, a curvature radius R10 of the image-side surface of the fifth lens, a maximum effective radius DT51 of an object-side surface of the fifth lens and a maximum effective radius DT52 of the image-side surface of the fifth lens may meet 0<(DT51+DT52)/R10<1.0.

In an implementation mode, a combined focal length f1234 of the first lens, the second lens, the third lens and the fourth lens and a combined focal length f78 of the seventh lens and the eighth lens may meet −1.5<f1234/f78<−0.5.

In an implementation mode, an edge thickness ET2 of the second lens, an edge thickness ET7 of the seventh lens and an edge thickness ET8 of the eighth lens may meet 0.5<ET8/(ET2+ET7)<1.0.

In an implementation mode, a maximum effective radius DT21 of an object-side surface of the second lens, a maximum effective radius DT22 of an image-side surface of the second lens, a maximum effective radius DT61 of an object-side surface of the sixth lens and a maximum effective radius DT62 of an image-side surface of the sixth lens may meet 0.3<(DT21+DT22)/(DT61+DT62)<0.8.

In an implementation mode, a maximum effective radius DT71 of an object-side surface of the seventh lens and a maximum effective radius DT82 of an image-side surface of the eighth lens may meet 0.3<DT71/DT82<0.8.

In an implementation mode, Semi-FOV is a half of a maximum field of view of the optical imaging lens assembly, and a total effective focal length f of the optical imaging lens assembly and Semi-FOV may meet f×tan(Semi-FOV)>6.5 mm.

In an implementation mode, $\Sigma CT$ is a sum of center thicknesses of the first lens to the eighth lens on the optical axis, $\Sigma AT$ is a sum of spacing distances of any two adjacent lenses in the first lens to the eighth lens on the optical axis, and $\Sigma CT$ and $\Sigma AT$ may meet 0.8<$\Sigma CT$/$\Sigma AT$<1.5.

In an implementation mode, an effective focal length f8 of the eighth lens and a curvature radius R16 of the image-side surface of the eighth lens may meet 0.5<f8/R16<1.5.

According to the disclosure, the refractive power is configured reasonably, and optical parameters are optimized, so that the provided optical imaging lens assembly is applicable to a portable electronic product and has the characteristics of large image surface, small size and high imaging quality.

BRIEF DESCRIPTION OF THE DRAWINGS

The other features, objectives and advantages of the disclosure become more apparent upon reading detailed descriptions made to unrestrictive implementation modes with reference to the following drawings.

DETAILED DESCRIPTION OF THE EMBODIMENTS

Figure 1:
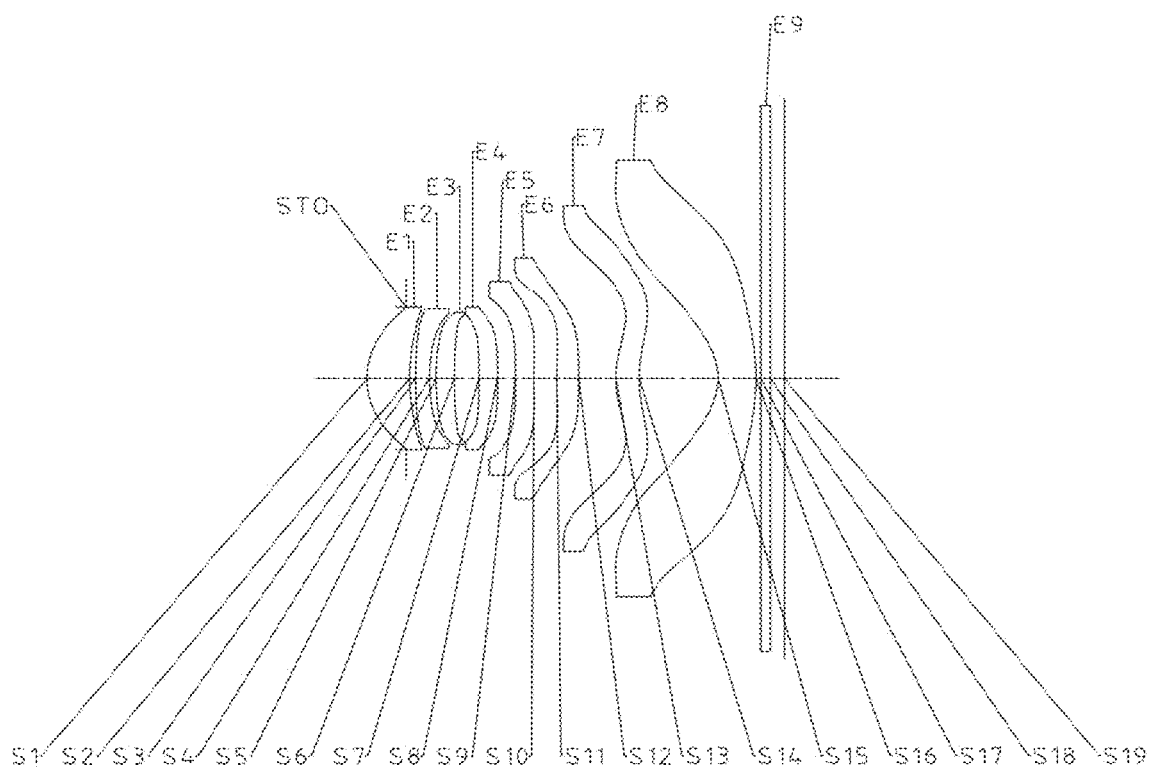
FIG. 1 is a structure diagram of an optical imaging lens assembly according to embodiment 1 of the disclosure.

In order to understand the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner.

In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have the same meanings as those in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include eight lenses with refractive power, i.e., a first lens, a second lens, a third lens, a fourth lens, a fifth lens, a sixth lens, a seventh lens, and an eighth lens respectively. The eight lenses are sequentially arranged from an object side to an image side along an optical axis. There may be a spacing distance between any two adjacent lenses in the first lens to the eighth lens.

In an exemplary implementation mode, the first lens to the eighth lens may all have positive refractive power or negative refractive power. An image-side surface of the eighth lens may be a convex surface. The surface type of the eighth lens may be reasonably configured to effectively solve the problem of lens sensitivity caused by the excessive concentration of the refractive power and contribute to making a tolerance requirement of the eighth lens conform to the existing process capability level better.

In an exemplary implementation mode, the fifth lens may have a negative refractive power, and an image-side surface thereof may be a concave surface. Such settings about the refractive power and surface type of the fifth lens may effectively balance a spherical aberration, a chromatic aberration and a distortion.

In an exemplary implementation mode, the optical imaging lens assembly according to the disclosure may meet $TTL/ImgH<1.2$, wherein TTL is a distance from an object-side surface of the first lens to an imaging surface of the optical imaging lens assembly on the optical axis, and ImgH is a half of a diagonal length of an effective pixel region of the optical imaging lens assembly. $TTL/ImgH<1.2$ is met, so that it may be ensured that the optical imaging lens assembly has a large enough image surface to present more detailed information of a shot scene under the condition of a relatively small size.

In an exemplary implementation mode, the optical imaging lens assembly according to the disclosure may meet $0.5<f8/R16<1.5$, where f8 is an effective focal length of the eighth lens, and R16 is a curvature radius of an image-side surface of the eighth lens. More specifically, f8 and R16 may further meet $0.5<f8/R16<1.0$. Meeting $0.5<f8/R16<1.5$ is favorable for reducing a ghost image generated by the eighth lens.

In an exemplary implementation mode, the optical imaging lens assembly according to the disclosure may meet $0.5<(R6-R5)/(R13+R14)<1.5$, wherein R5 is a curvature radius of an object-side surface of the third lens, R6 is a curvature radius of an image-side surface of the third lens, R13 is a curvature radius of an object-side surface of the seventh lens, and R14 is a curvature radius of an image-side surface of the seventh lens. More specifically, R6, R5, R13 and R14 may further meet $0.6<(R6-R5)/(R13+R14)<1.1$. Meeting $0.5<(R6-R5)/(R13+R14)<1.5$ is favorable for solving the problems of difficulties in machining and the like brought by excessively large inclination angles of the third lens and the seventh lens. In addition, the curvature radii of the third lens and the seventh lens are controlled reasonably, so that light entering the third lens and the seventh lens may be collected effectively and prevented from being excessively deflected to prevent the conditions of steep light and the like.

In an exemplary implementation mode, the optical imaging lens assembly according to the disclosure may meet $0.5<R7/(R7-R11)<1.0$, wherein R7 is a curvature radius of an object-side surface of the fourth lens, and R11 is a curvature radius of an object-side surface of the sixth lens. More specifically, R7 and R11 may further meet $0.7<R7/(R7-R11)<1.0$. $0.5<R7/(R7-R11)<1.0$ is met, so that a relatively small difference between the curvature radii of the fourth lens and the sixth lens may be ensured to prevent difficulties brought by subsequent machining and adjustment.

In an exemplary implementation mode, the optical imaging lens assembly according to the disclosure may meet $0<T67/T78<0.6$, wherein T67 is a spacing distance of the sixth lens and the seventh lens on the optical axis, and T78 is a spacing distance of the seventh lens and the eighth lens on the optical axis. More specifically, T67 and T78 may further meet $0.3<T67/T78<0.6$. Meeting $0<T67/T78<0.6$ may ensure the machining and assembling characteristics of the sixth lens to the eighth lens, solve the problems of interference between previous and next lenses and the like in an assembling process due to excessively small gaps as well as the problems of great difficulties in forming, high deformation rate during assembling and the like caused by excessively small thicknesses of the lenses, and meanwhile, is favorable for retarding the deflection of light, adjusting a field curvature of the lens assembly and reducing the sensitivity of the lens assembly to further contribute to achieving higher imaging quality.

In an exemplary implementation mode, the optical imaging lens assembly according to the disclosure may meet $-1.3<(f1+f3)/(f2\pm f5)<-0.3$, wherein f1 is an effective focal length of the first lens, f2 is an effective focal length of the second lens, f3 is an effective focal length of the third lens, and f5 is an effective focal length of the fifth lens. More specifically, f1, f3, f2 and f5 may further meet $-1.2<(f1+f3)/(f2+f5)<-0.4$. $-1.3<(f1+f3)/(f2+f5)<-0.3$ is met, so that an aberration of the whole lens assembly may be balanced, the imaging quality of the lens assembly may be improved, a trend of the light may be controlled reasonably to avoid excessively high sensitivity of the first lens, the second lens, the third lens and the fifth lens caused by excessively steep light, and the lens assembly may be miniaturized.

In an exemplary implementation mode, the optical imaging lens assembly according to the disclosure may meet $0<f/f6<1.0$, wherein f is a total effective focal length of the optical imaging lens assembly, and f6 is an effective focal length of the sixth lens. More specifically, f and f6 may further meet $0.2<f/f6<0.7$. $0<f/f6<1.0$ is met, so that not only may a tolerance requirement of the sixth lens be reduced, but also spherical aberrations, chromatic aberrations and astigmatisms generated by the other lenses may be balanced effectively.

In an exemplary implementation mode, the optical imaging lens assembly according to the disclosure may meet $0.3<(R2-R1)/(R3-R4)<1.3$, wherein R1 is a curvature radius of an object-side surface of the first lens, R2 is a curvature radius of an image-side surface of the first lens, R3 is a curvature radius of an object-side surface of the second lens, and R4 is a curvature radius of an image-side surface of the second lens. More specifically, R2, R1, R3 and R4 may further meet $0.4<(R2-R1)/(R3-R4)<1.3$. $0.3<(R2-R1)/(R3-R4)<1.3$ is met, so that problems of difficulties in machining and the like brought by excessively large inclination angles of the first lens and the second lens may be solved, a spherical aberration of the whole lens assembly may be balanced effectively, the sensitivity of the first lens and the second lens may be reduced, and the first lens and the second lens may converge external light better to achieve a larger aperture of the lens assembly.

In an exemplary implementation mode, the optical imaging lens assembly according to the disclosure may meet $0<(DT51+DT52)/R10<1.0$, wherein R10 is a curvature radius of an image-side surface of the fifth lens, DT51 is a maximum effective radius of an object-side surface of the fifth lens, and DT52 is a maximum effective radius of the image-side surface of the fifth lens. More specifically, DT51, DT52 and R10 may further meet $0.2<(DT51+DT52)/R10<0.6$. $0<(DT51+DT52)/R10<1.0$ is met, so that the problems of difficulties in machining and the like brought by an unreasonable effective radius or curvature radius of the fifth lens may be solved, and meanwhile, it may be ensured that the fifth lens is uniform in size.

In an exemplary implementation mode, the optical imaging lens assembly according to the disclosure may meet $-1.5<f1234/f78<-0.5$, wherein f1234 is a combined focal length of the first lens, the second lens, the third lens and the fourth lens, and f78 is a combined focal length of the seventh lens and the eighth lens. More specifically, f1234 and f78 may further meet $-1.4<f1234/f78<-0.6$. $-1.5<f1234/f78<-0.5$ is met, so that an aberration of the whole lens assembly may be balanced, the imaging quality of the lens assembly may be improved, a trend of the light may be controlled reasonably to avoid excessively high sensitivity of the first lens, the second lens, the third lens, the fourth lens, the seventh lens and the eighth lens caused by excessively steep light, and the lens assembly may be miniaturized.

In an exemplary implementation mode, the optical imaging lens assembly according to the disclosure may meet $0.5<ET8/(ET2+ET7)<1.0$, wherein ET2 is an edge thickness of the second lens, ET7 is an edge thickness of the seventh lens, and ET8 is an edge thickness of the eighth lens. More specifically, ET8, ET2 and ET7 may further meet $0.6<ET8/(ET2+ET7)<1.0$. $0.5<ET8/(ET2+ET7)<1.0$ is met, so that machining and assembling processes of the second lens, the seventh lens and the eighth lens may be ensured, the problems of difficulties in practical debugging, high deformation rate of the lenses in an assembling process, and the like due to excessively small thicknesses of the lenses may be solved to contribute to improving the quality of the lens assembly, and the lens assembly may also be prevented from an excessively large front-end size to contribute to miniaturizing the front end of the lens assembly.

In an exemplary implementation mode, the optical imaging lens assembly according to the disclosure may meet $0.3<(DT21+DT22)/(DT61+DT62)<0.8$, wherein DT21 is a maximum effective radius of an object-side surface of the second lens, DT22 is a maximum effective radius of an image-side surface of the second lens, DT61 is a maximum effective radius of an object-side surface of the sixth lens, and DT62 is a maximum effective radius of an image-side surface of the sixth lens. More specifically, DT21, DT22, DT61 and DT62 may further meet $0.5<(DT21+DT22)/(DT61+DT62)<0.7$. $0.3<(DT21+DT22)/(DT61+DT62)<0.8$ is met, so that the problems of difficulties in machining, assembling and debugging, and the like brought by excessively large differences between previous lenses and next lenses may be solved.

In an exemplary implementation mode, the optical imaging lens assembly according to the disclosure may meet $0.3<DT71/DT82<0.8$, wherein DT71 is a maximum effective radius of an object-side surface of the seventh lens, and DT82 is a maximum effective radius of an image-side surface of the eighth lens. More specifically, DT71 and DT82 may further meet $0.5<DT71/DT82<0.8$. $0.3<DT71/DT82<0.8$ is met, so that a vignetting value of the lens assembly may be controlled effectively, light with relatively low imaging quality may be intercepted to improve the resolving power of the whole lens assembly, and the problem of large segment gap caused by an excessively large difference between apertures of an image-side surface of the seventh lens and an object-side surface of the eighth lens may also be solved to ensure the assembling stability of the lens assembly.

In an exemplary implementation mode, the optical imaging lens assembly according to the disclosure may meet $f\times tan(Semi\text{-}FOV)>6.5$ mm, wherein f is a total effective focal length of the optical imaging lens assembly, and Semi-FOV is a half of a maximum field of view of the optical imaging lens assembly. f×tan(Semi-FOV)>6.5 mm is met, so that it may be ensured that the lens assembly has a larger image surface on the basis of implementing miniaturization.

In an exemplary implementation mode, the optical imaging lens assembly according to the disclosure may meet 0.8<ΣCT/ΣAT<1.5, wherein ΣCT is a sum of center thicknesses of the first lens to the eighth lens on the optical axis, and ΣAT is a sum of spacing distances of any two adjacent lenses in the first lens to the eighth lens on the optical axis. More specifically, ΣCT and ΣAT may further meet 0.8<ΣCT/ΣAT<1.1. 0.8<ΣCT/ΣAT<1.5 is met, so that ghost images and distortions caused by excessively large or small thicknesses and spacing distances of the first lens to the eighth lens may be avoided effectively.

In an exemplary implementation mode, the optical imaging lens assembly according to the disclosure further includes a diaphragm arranged between the object side and the first lens. Optionally, the optical imaging lens assembly may further include an optical filter configured to correct the chromatic aberration and/or protective glass configured to protect a photosensitive element on the imaging surface. The disclosure discloses an optical imaging lens assembly with the characteristics of small size, large image surface, high imaging quality, etc. The optical imaging lens assembly according to the implementation mode of the disclosure may adopt multiple lenses, for example, the above-mentioned eight. The refractive power and surface types of each lens, the center thickness of each lens, on-axis distances between the lenses and the like may be reasonably configured to effectively converge incident light, reduce a total track length of the imaging lens assembly, improve the machinability of the imaging lens assembly and ensure that the optical imaging lens assembly is more favorable for production and machining.

In the implementation mode of the disclosure, at least one of mirror surfaces of each lens is an aspheric mirror surface, namely at least one mirror surface in an object-side surface of the first lens to an image-side surface of the eighth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens, the seventh lens and the eighth lens is an aspheric mirror surface. Optionally, both the object-side surface and image-side surface of each lens in the first lens, the second lens, the third lens, the fourth lens, the fifth lens, the sixth lens, the seventh lens and the eighth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with eight lenses as an example, the optical imaging lens assembly is not limited to eight lenses. If necessary, the optical imaging lens assembly may further include another number of lenses.

Specific embodiments applied to the optical imaging lens assembly of the above-mentioned implementation mode will further be described below with reference to the drawings.

Embodiment 1

An optical imaging lens assembly according to embodiment 1 of the disclosure will be described below with reference to FIGS. 1 to 2C. FIG. 1 is a structure diagram of an optical imaging lens assembly according to embodiment 1 of the disclosure.

As shown in FIG. 1, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a convex surface. The seventh lens E7 has a positive refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

Table 1 is a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8383 | | | | |
| S1 | Aspheric | 2.8125 | 0.9108 | 1.55 | 56.1 | 7.86 | 0.0191 |
| S2 | Aspheric | 7.2348 | 0.1262 | | | | −3.0155 |
| S3 | Aspheric | 15.6238 | 0.3000 | 1.67 | 19.2 | −18.21 | −2.7030 |
| S4 | Aspheric | 6.8381 | 0.1358 | | | | 0.2372 |
| S5 | Aspheric | 7.8404 | 0.4207 | 1.55 | 56.1 | 27.73 | 13.5946 |
| S6 | Aspheric | 15.9548 | 0.5009 | | | | 14.4413 |
| S7 | Aspheric | −194.9434 | 0.3980 | 1.57 | 38.0 | 106.70 | −77.6626 |
| S8 | Aspheric | −46.3848 | 0.3764 | | | | −12.4451 |
| S9 | Aspheric | 139.7818 | 0.4000 | 1.67 | 19.2 | −36.59 | −77.1195 |
| S10 | Aspheric | 21.0155 | 0.4890 | | | | −79.9999 |
| S11 | Aspheric | 18.9488 | 0.4690 | 1.57 | 38.0 | 23.71 | −0.0233 |
| S12 | Aspheric | −46.7019 | 0.7924 | | | | −0.0496 |
| S13 | Aspheric | 3.8355 | 0.5000 | 1.55 | 56.1 | 20.50 | −1.0000 |
| S14 | Aspheric | 5.5670 | 1.6848 | | | | −1.1610 |
| S15 | Aspheric | −2.1813 | 0.8113 | 1.55 | 56.1 | −6.22 | −1.0000 |
| S16 | Aspheric | −6.9039 | 0.1000 | | | | −0.1108 |
| S17 | Spherical | Infinite | 0.2100 | 1.52 | 64.2 | | |
| S18 | Spherical | Infinite | 0.2930 | | | | |
| S19 | Spherical | Infinite | | | | | |

In the example, a total effective focal length f of the optical imaging lens assembly is 8.03 mm. TTL is a total length of the optical imaging lens assembly (i.e., a distance from the object-side surface S1 of the first lens E1 to the imaging surface S19 of the optical imaging lens assembly on an optical axis), and TTL is 8.92 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly, and Semi-FOV is 44.2°. f/EPD is a ratio of the total effective focal length f of the optical imaging lens assembly to an Entrance Pupil Diameter (EPD) of the optical imaging lens assembly, and f/EPD is 1.99.

In embodiment 1, both the object-side surface and image-side surface of any lens in the first lens E1 to the eighth lens E8 are aspheric surfaces, and a surface type x of each aspheric lens may be defined through, but not limited to, the following aspheric surface formula:

$$x = \frac{ch^3}{1 + \sqrt{1 - (k+1)c^2 h^3}} + \sum A_i h. \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient: and Ai is a correction coefficient of the i-th order of the aspheric surface. Tables 2-1 and 2-2 show higher-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ that can be used for each of the aspheric mirror surfaces S1-316 in embodiment 1.

TABLE 2-1

| Surface number | A4 | A6 | A8 | A10 | A12 | A14 | A16 |
|---|---|---|---|---|---|---|---|
| S1 | −4.1563E−03 | −7.3410E−03 | −3.7063E−03 | −1.4009E−03 | −4.7417E−04 | −1.2263E−04 | −1.9621E−05 |
| S2 | −1.6055E−02 | 2.2815E−03 | 1.4778E−03 | 2.4690E−05 | 6.9939E−05 | 4.7999E−05 | −1.0664E−04 |
| S3 | 5.9195E−02 | 1.4145E−02 | 4.0279E−03 | 1.4904E−03 | 6.5139E−04 | 1.4517E−04 | −1.4372E−04 |
| S4 | 1.1613E−01 | 1.8988E−02 | −6.3113E−04 | −1.2488E−03 | −1.6021E−04 | 3.1785E−04 | 1.4416E−04 |
| S5 | 1.7963E−03 | 4.4177E−02 | 7.4683E−03 | −3.9613E−04 | −3.5789E−04 | 2.4720E−04 | 1.5819E−04 |
| S6 | 2.4591E−02 | 3.7929E−02 | 1.1859E−02 | 3.4205E−03 | 1.0533E−03 | 3.8939E−04 | 1.3146E−04 |
| S7 | −2.5117E−01 | −1.6339E−02 | 1.7075E−03 | 1.2922E−03 | 8.5631E−04 | 4.7983E−04 | 2.6544E−04 |
| S8 | −3.6029E−01 | −1.0283E−02 | 1.1259E−02 | 6.7823E−03 | 4.0185E−03 | 2.1278E−03 | 1.0466E−03 |
| S9 | −5.5028E−01 | −1.4949E−02 | −1.2183E−02 | −1.8415E−03 | 3.5056E−04 | 7.5400E−04 | 7.1938E−04 |
| S10 | −8.1701E−01 | 1.0063E−01 | 1.9140E−02 | 5.7807E−03 | −7.4367E−03 | −6.5821E−03 | −2.0080E−03 |
| S11 | −1.4283E−00 | 1.6701E−01 | 1.1325E−01 | 9.7952E−03 | −1.8893E−02 | −1.4777E−02 | −1.9438E−04 |
| S12 | −1.1176E−00 | 2.9041E−01 | −4.0788E−02 | −1.8845E−02 | 1.3819E−02 | 6.6527E−03 | −9.6622E−04 |
| S13 | −5.0578E−00 | 1.2197E−00 | −1.0353E−01 | −4.8823E−02 | 1.1408E−02 | −1.1881E−02 | 6.6617E−03 |
| S14 | −4.2161E−00 | 8.3946E−01 | −6.3105E−02 | 1.8750E−02 | 3.7358E−02 | −3.8305E−02 | −8.0075E−03 |
| S15 | 6.9533E−00 | −8.4031E−01 | 1.3587E−01 | −3.9128E−02 | 3.7715E−02 | −4.1295E−02 | 2.0130E−02 |
| S16 | 1.6666E−00 | −2.3380E−01 | 3.9348E−01 | −9.2794E−02 | 9.0539E−03 | −1.5993E−02 | 2.0667E−03 |

TABLE 2-2

| Surface number | A18 | A20 | A22 | A24 | A26 | A28 | A30 |
|---|---|---|---|---|---|---|---|
| S1 | 7.2836E−06 | 4.6801E−06 | 0.0000E+00 | 0.0000E+00 | 0.0000E+00 | 0.0000E+00 | 0.0000E+00 |
| S2 | −1.0186E−04 | −3.9045E−05 | 0.0000E+00 | 0.0000E+00 | 0.0000E+00 | 0.0000E+00 | 0.0000E+00 |
| S3 | −1.1000E−04 | −2.9578E−05 | 0.0000E+00 | 0.0000E+00 | 0.0000E+00 | 0.0000E+00 | 0.0000E+00 |
| S4 | 2.4271E−05 | −5.9703E−06 | 0.0000E+00 | 0.0000E+00 | 0.0000E+00 | 0.0000E+00 | 0.0000E+00 |
| S5 | 2.3428E−05 | −1.2702E−05 | 0.0000E+00 | 0.0000E+00 | 0.0000E+00 | 0.0000E+00 | 0.0000E+00 |
| S6 | 4.2100E−05 | 8.7616E−06 | 0.0000E+00 | 0.0000E+00 | 0.0000E+00 | 0.0000E+00 | 0.0000E+00 |
| S7 | 9.8429E−05 | 3.5044E−05 | 0.0000E+00 | 0.0000E+00 | 0.0000E+00 | 0.0000E+00 | 0.0000E+00 |
| S8 | 3.4856E−04 | 1.1087E−04 | 0.0000E+00 | 0.0000E+00 | 0.0000E+00 | 0.0000E+00 | 0.0000E+00 |
| S9 | 1.9248E−04 | 1.2481E−04 | 0.0000E+00 | 0.0000E+00 | 0.0000E+00 | 0.0000E+00 | 0.0000E+00 |
| S10 | −2.7479E−04 | 2.6420E−04 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−04 | −1.3720E−05 | −8.4027E−07 |
| S13 | 3.3959E−04 | −2.8985E−03 | 5.0489E−04 | 1.0468E−05 | 9.4453E−07 | 0.0000E+00 | 0.0000E+00 |
| S14 | −4.8132E−03 | 1.8971E−03 | 1.7124E−04 | 4.3785E−05 | 4.7923E−04 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 2A:
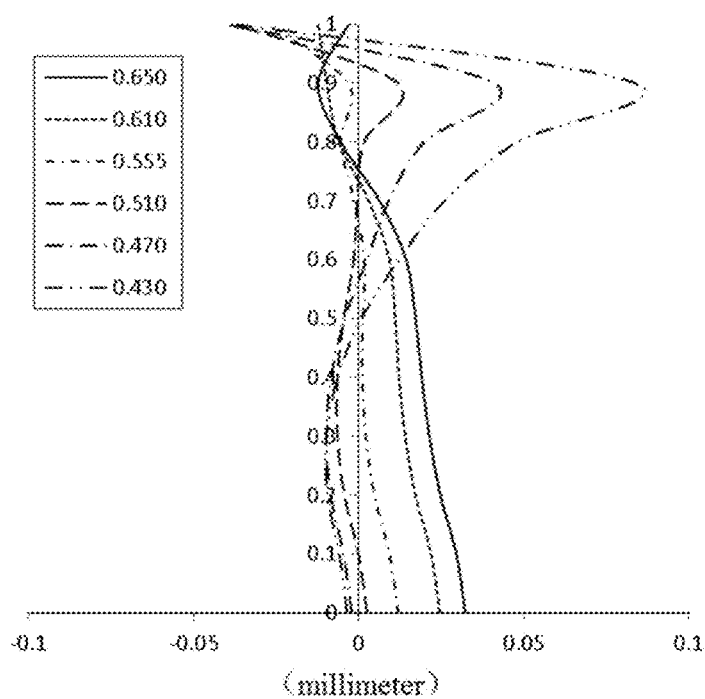
FIGS. 2A to 2C show a longitudinal aberration curve, an astigmatism curve and a lateral color curve of an optical imaging lens assembly according to embodiment 1 respectively.
Figure 2B:
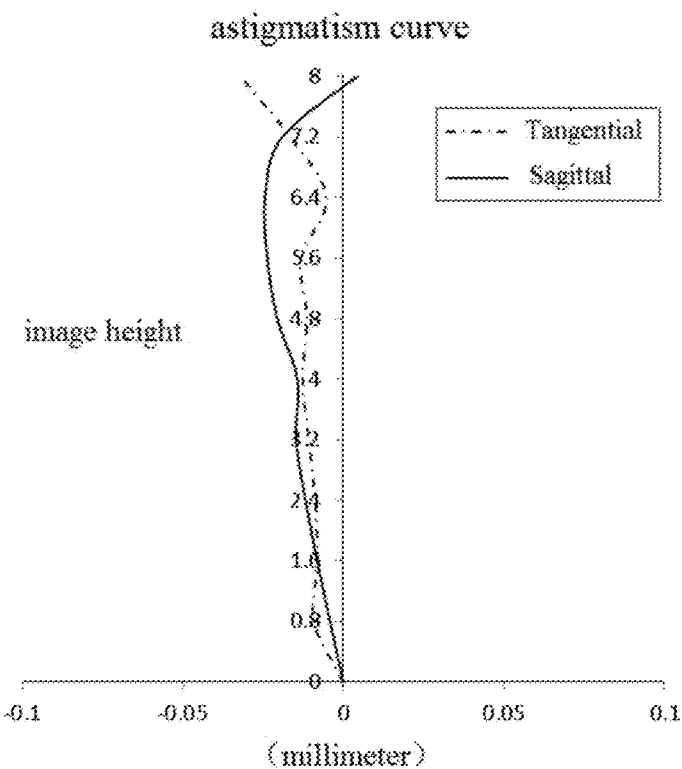
Figure 2C:
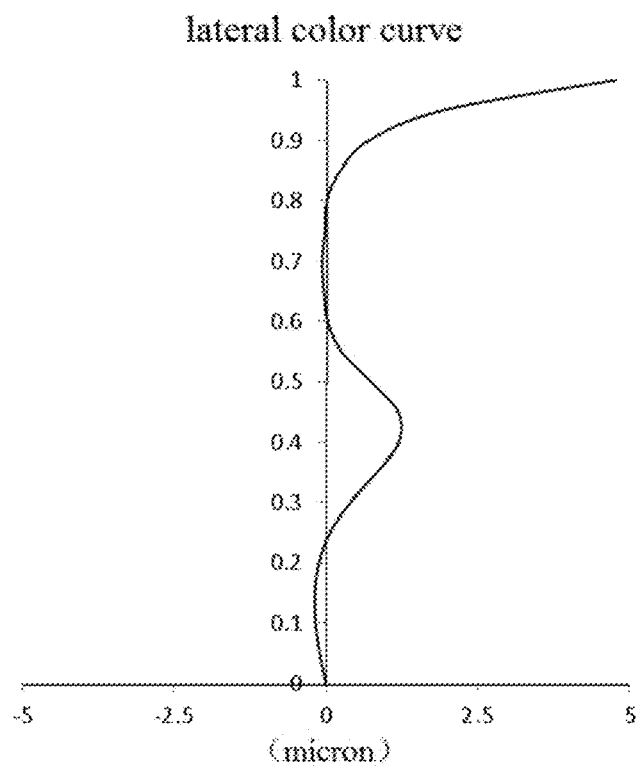

FIG. 2A shows a longitudinal aberration curve of the optical imaging lens assembly according to embodiment 1 to represent deviations of a convergence focal point after light with different wavelengths passes through the lens assembly. FIG. 2B shows an astigmatism curve of the optical imaging lens assembly according to embodiment 1 to represent a tangential image surface curvature and a sagittal image surface curvature. FIG. 2C shows a lateral color curve of the optical imaging lens assembly according to embodiment 1 to represent deviations of different image heights on the imaging surface after the light passes through the lens assembly. According to FIGS. 2A to 2C, it can be seen that the optical imaging lens assembly provided in embodiment 1 may achieve high imaging quality.

Embodiment 2

Figure 3:
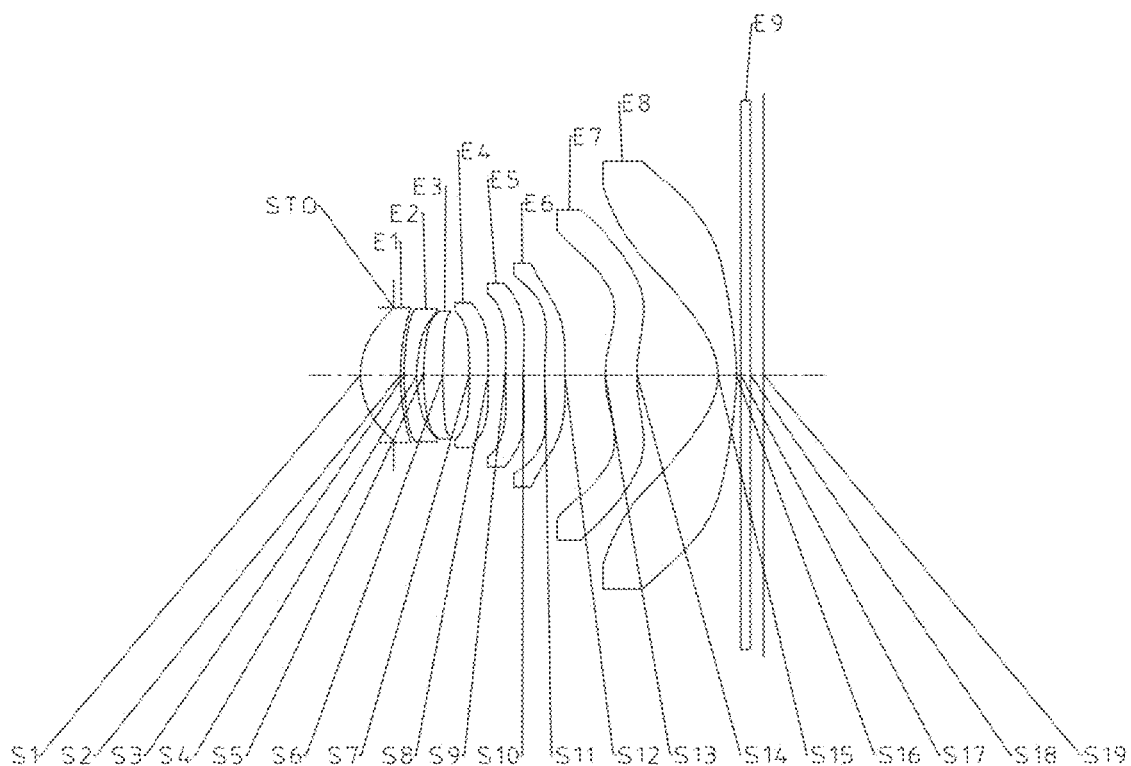
FIG. 3 is a structure diagram of an optical imaging lens assembly according to embodiment 2 of the disclosure.

An optical imaging lens assembly according to embodiment 2 of the disclosure will be described below with reference to FIGS. 3 to 4C. In the embodiment and the following embodiments, part of descriptions similar to those about embodiment 1 are omitted for simplicity. FIG. 3 is a structure diagram of an optical imaging lens assembly according to embodiment 2 of the disclosure.

As shown in FIG. 3, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

In the example, a total effective focal length f of the optical imaging lens assembly is 7.53 mm. TTL is a total length of the optical imaging lens assembly, and TTL is 8.76 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly is 42.8°. f/EPD is a ratio of the total effective focal length f of the optical imaging lens assembly to an EPD of the optical imaging lens assembly, and f/EPD is 1.99.

Table 3 is a basic parameter table of the optical imaging lens assembly of embodiment 2, and units of the curvature radius, the thickness/distance and the focal length are all millimeter (mm). Tables 4-1 and 4-2 show high-order coefficients that can be used for each aspheric mirror surface in embodiment 2. A surface type of each aspheric surface may be defined by formula (1) given in embodiment 1.

TABLE 3

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7237 | | | | |
| S1 | Aspheric | 2.8555 | 0.8658 | 1.55 | 56.1 | 7.63 | 0.0485 |
| S2 | Aspheric | 8.1149 | 0.0830 | | | | −0.4811 |

TABLE 3-continued

| Surface number | Surface type | Curvature radius | Thickness/ distance | Material Refractive index | Abbe number | Focal length | Conic coefficient |
|---|---|---|---|---|---|---|---|
| S3 | Aspheric | 10.8317 | 0.2740 | 1.67 | 19.2 | −16.54 | −0.8147 |
| S4 | Aspheric | 5.4495 | 0.1450 | | | | 0.1858 |
| S5 | Aspheric | 7.7546 | 0.4224 | 1.55 | 56.1 | 25.82 | 13.6936 |
| S6 | Aspheric | 16.9043 | 0.5738 | | | | 14.6440 |
| S7 | Aspheric | −70.1907 | 0.4123 | 1.57 | 38.0 | −110.00 | 50.0000 |
| S8 | Aspheric | 587.8133 | 0.3703 | | | | 50.0000 |
| S9 | Aspheric | 17.9798 | 0.3878 | 1.67 | 19.2 | −52.00 | 0.7452 |
| S10 | Aspheric | 11.7973 | 0.4699 | | | | −53.6980 |
| S11 | Aspheric | 12.3939 | 0.4379 | 1.57 | 38.0 | 22.14 | −18.1826 |
| S12 | Aspheric | 687.9991 | 0.8790 | | | | 50.0000 |
| S13 | Aspheric | 4.0946 | 0.6914 | 1.55 | 56.1 | 17.60 | −1.2893 |
| S14 | Aspheric | 6.7090 | 1.7588 | | | | −1.2165 |
| S15 | Aspheric | −2.2903 | 0.4037 | 1.55 | 56.1 | −5.91 | −1.0000 |
| S16 | Aspheric | −8.3954 | 0.0929 | | | | 0.5041 |
| S17 | Spherical | Infinite | 0.2100 | 1.52 | 64.2 | | |
| S18 | Spherical | Infinite | 0.2860 | | | | |
| S19 | Spherical | Infinite | | | | | |

TABLE 4-1

| Surface number | A4 | A6 | A8 | A10 | A12 | A14 | A16 |
|---|---|---|---|---|---|---|---|
| S1 | 1.9791E−03 | −7.1497E−03 | −3.9719E−03 | −1.6145E−03 | −5.5054E−04 | −1.5771E−04 | −2.6235E−05 |
| S2 | −6.4105E−03 | 5.0214E−03 | −4.1668E−04 | −6.7793E−04 | −1.0888E−04 | −3.3508E−06 | −2.6099E−05 |
| S3 | 6.1581E−02 | 1.9747E−02 | 1.6815E−03 | 4.0789E−04 | 1.6653E−04 | −2.0568E−04 | −2.9676E−04 |
| S4 | 1.1499E−01 | 2.5483E−02 | 1.6511E−02 | −4.7212E−04 | 2.7795E−04 | 6.4072E−04 | 4.1073E−04 |
| S5 | 5.1906E−02 | 4.3261E−02 | 7.9555E−03 | −6.2073E−04 | −2.5217E−04 | 6.3150E−04 | 5.5954E−04 |
| S6 | 2.4931E−02 | 3.6495E−02 | 1.2119E−02 | 3.6732E−03 | 1.1092E−03 | 3.4312E−04 | 8.7147E−05 |
| S7 | −2.5710E−01 | −1.4186E−02 | 1.7390E−03 | 1.4589E−03 | 1.0428E−03 | 5.1258E−04 | 2.6415E−04 |
| S8 | −3.8011E−01 | −1.2141E−02 | 6.9321E−03 | 4.5024E−03 | 2.8436E−03 | 1.4534E−03 | 7.1349E−04 |
| S9 | −5.4651E−01 | −6.6257E−03 | −1.1379E−02 | −1.5852E−03 | −4.2305E−04 | 1.4779E−04 | 2.5226E−04 |
| S10 | −8.3509E−01 | 7.6968E−02 | 1.7260E−02 | 6.4151E−03 | −6.8880E−03 | −7.5434E−03 | −3.6603E−03 |
| S11 | −1.4283E+00 | 1.6701E−01 | 1.1325E−01 | 9.7952E−03 | −1.8893E−02 | −1.4777E−02 | −1.9438E−04 |
| S12 | −1.1176E+00 | 2.9041E−01 | −4.0788E−02 | −1.8845E−02 | 1.3819E−02 | 6.6527E−03 | −9.6622E−04 |
| S13 | −5.0578E+00 | 1.2197E+00 | −1.0353E−01 | −4.8823E−02 | 1.1408E−02 | −1.1881E−02 | 6.6617E−03 |
| S14 | −4.2161E+00 | 8.3946E−01 | −6.3105E−02 | 1.8750E−02 | 3.7358E−02 | −3.8305E−02 | −8.0075E−03 |
| S15 | 6.9533E+00 | −8.4031E−01 | 1.3587E−01 | −3.9128E−02 | 3.7715E−02 | −4.1295E−02 | 2.0130E−02 |
| S16 | 1.6666E+00 | −2.3380E−01 | 3.9348E−01 | −9.2794E−02 | 9.0539E−03 | −1.5993E−02 | 2.0667E−03 |

TABLE 4-2

| Surface number | A18 | A20 | A22 | A24 | A26 | A28 | A30 |
|---|---|---|---|---|---|---|---|
| S1 | 4.4086E−06 | 4.2006E−06 | 0.0000E+00 | 0.0000E+00 | 0.0000E+00 | 0.0000E+00 | 0.0000E+00 |
| S2 | −3.3993E−05 | −1.3856E−05 | 0.0000E+00 | 0.0000E+00 | 0.0000E+00 | 0.0000E+00 | 0.0000E+00 |
| S3 | −1.6379E−04 | −4.0096E−05 | 0.0000E+00 | 0.0000E+00 | 0.0000E+00 | 0.0000E+00 | 0.0000E+00 |
| S4 | 1.4706E−04 | 2.9542E−05 | 0.0000E+00 | 0.0000E+00 | 0.0000E+00 | 0.0000E+00 | 0.0000E+00 |
| S5 | 2.3955E−04 | 5.3277E−05 | 0.0000E+00 | 0.0000E+00 | 0.0000E+00 | 0.0000E+00 | 0.0000E+00 |
| S6 | 1.0398E−05 | −2.2998E−06 | 0.0000E+00 | 0.0000E+00 | 0.0000E+00 | 0.0000E+00 | 0.0000E+00 |
| S7 | 8.8382E−05 | 2.8671E−05 | 0.0000E+00 | 0.0000E+00 | 0.0000E+00 | 0.0000E+00 | 0.0000E+00 |
| S8 | 2.2959E−04 | 8.0142E−05 | 0.0000E+00 | 0.0000E+00 | 0.0000E+00 | 0.0000E+00 | 0.0000E+00 |
| S9 | 1.8866E−05 | 3.3742E−05 | 0.0000E+00 | 0.0000E+00 | 0.0000E+00 | 0.0000E+00 | 0.0000E+00 |
| S10 | −1.2672E−03 | −7.5511E−05 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−04 | −1.3720E−05 | −8.4025E−07 |
| S13 | 3.3959E−04 | −2.8985E−03 | 5.0489E−04 | 1.0468E−05 | 9.4446E−07 | 0.0000E+00 | 0.0000E+00 |
| S14 | −4.8132E−03 | 1.8971E−03 | 1.7124E−03 | 4.3785E−05 | 4.7923E−04 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 4A:
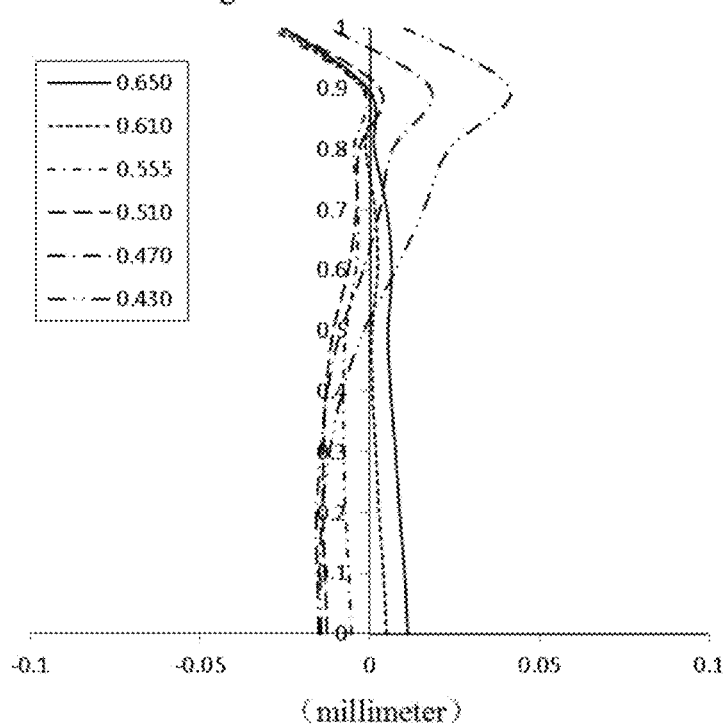
FIGS. 4A to 4C show a longitudinal aberration curve, an astigmatism curve and a lateral color curve of an optical imaging lens assembly according to embodiment 2 respectively.
Figure 4B:
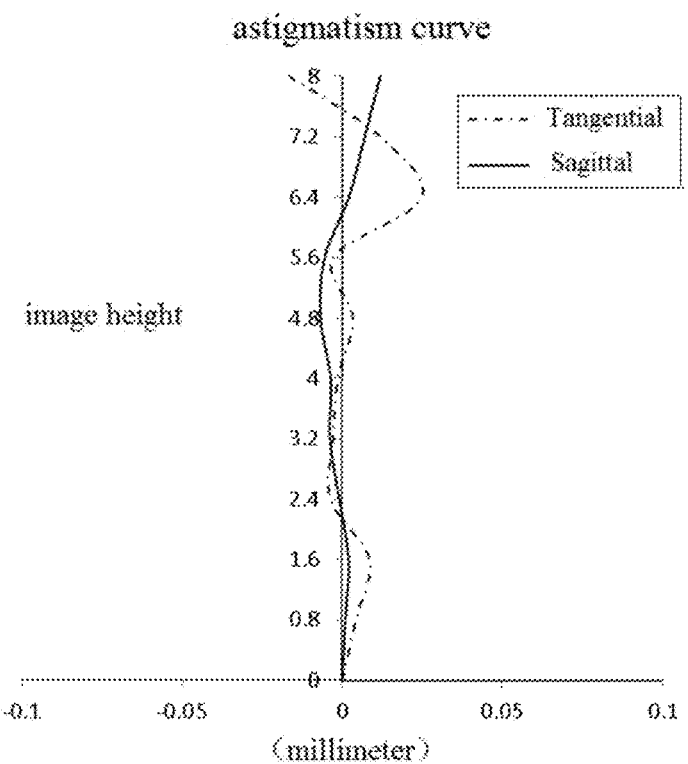
Figure 4C:
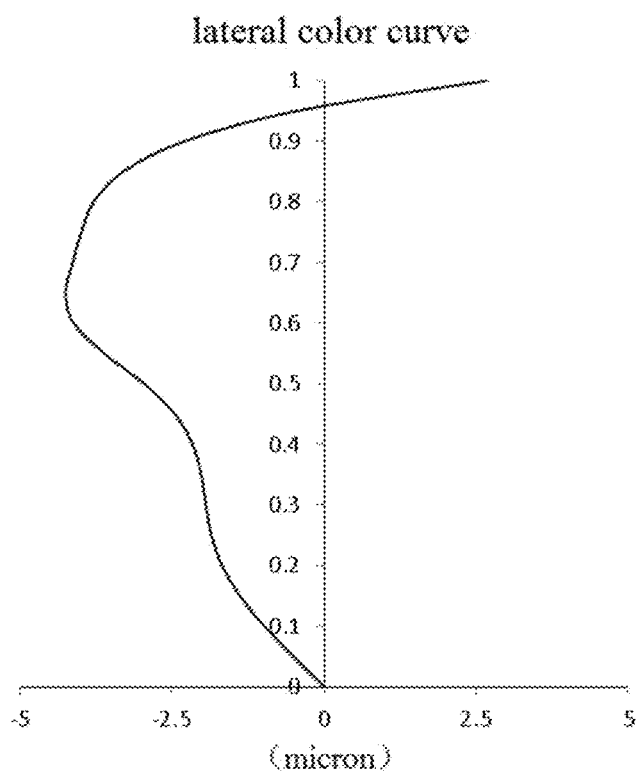

FIG. 4A shows a longitudinal aberration curve of the optical imaging lens assembly according to embodiment 2 to represent deviations of a convergence focal point after light with different wavelengths passes through the lens assembly. FIG. 4B shows an astigmatism curve of the optical imaging lens assembly according to embodiment 2 to represent a tangential image surface curvature and a sagittal image surface curvature. FIG. 4C shows a lateral color curve of the optical imaging lens assembly according to embodiment 2 to represent deviations of different image heights on the imaging surface after the light passes through the lens assembly. According to FIGS. 4A to 4C, it can be seen that the optical imaging lens assembly provided in embodiment 2 may achieve high imaging quality.

Embodiment 3

Figure 5:
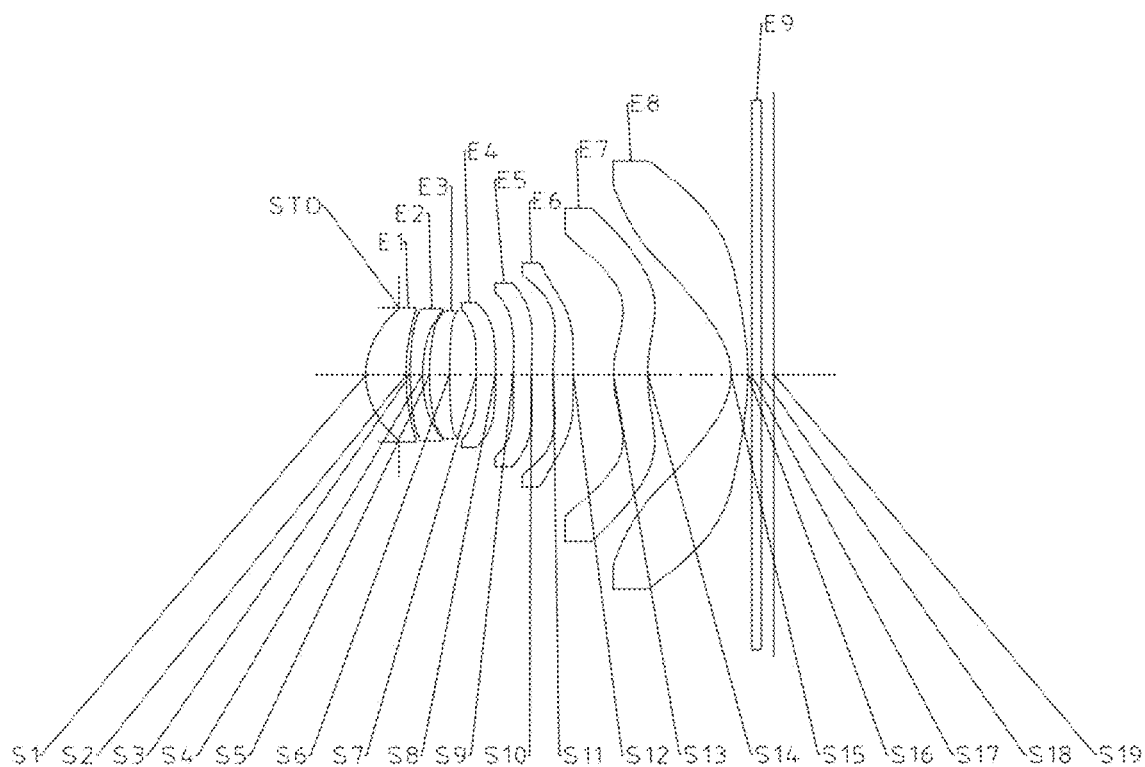
FIG. 5 is a structure diagram of an optical imaging lens assembly according to embodiment 3 of the disclosure.

An optical imaging lens assembly according to embodiment 3 of the disclosure will be described below with reference to FIGS. 5 to 6C. FIG. 5 is a structure diagram of an optical imaging lens assembly according to embodiment 3 of the disclosure.

As shown in FIG. 5, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

In the example, a total effective focal length f of the optical imaging lens assembly is 7.50 mm. TTL is a total length of the optical imaging lens assembly, and TTL is 8.76 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly is 42.7°. f/EPD is a ratio of the total effective focal length f of the optical imaging lens assembly to an EPD of the optical imaging lens assembly, and f/EPD is 1.99.

Table 5 is a basic parameter table of the optical imaging lens assembly of embodiment 3, and units of the curvature radius, the thickness/distance and the focal length are all millimeter (mm). Tables 6-1 and 6-2 show high-order coefficients that can be used for each aspheric mirror surface in embodiment 3. A surface type of each aspheric surface may be defined by formula (1) given in embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7164 | | | | |
| S1 | Aspheric | 2.8580 | 0.8647 | 1.55 | 56.1 | 7.62 | 0.0487 |
| S2 | Aspheric | 8.1658 | 0.0832 | | | | −0.3439 |
| S3 | Aspheric | 10.7886 | 0.2715 | 1.67 | 19.2 | −16.48 | −0.9206 |
| S4 | Aspheric | 5.4283 | 0.1443 | | | | 0.1938 |
| S5 | Aspheric | 7.7557 | 0.4312 | 1.55 | 56.1 | 25.72 | 13.7074 |
| S6 | Aspheric | 16.9867 | 0.5774 | | | | 14.9868 |
| S7 | Aspheric | −67.2589 | 0.4076 | 1.57 | 38.0 | −178.58 | 50.0000 |
| S8 | Aspheric | −198.7752 | 0.3805 | | | | 50.0000 |
| S9 | Aspheric | 19.7793 | 0.3883 | 1.67 | 19.2 | −45.86 | 9.0140 |
| S10 | Aspheric | 11.9856 | 0.4726 | | | | −49.6026 |
| S11 | Aspheric | 12.0686 | 0.4313 | 1.57 | 38.0 | 23.59 | −21.2186 |
| S12 | Aspheric | 116.5578 | 0.8635 | | | | −99.0000 |
| S13 | Aspheric | 4.1450 | 0.7348 | 1.55 | 56.1 | 18.01 | −1.4015 |
| S14 | Aspheric | 6.7167 | 1.7902 | | | | −1.2397 |
| S15 | Aspheric | −2.3006 | 0.3604 | 1.55 | 56.1 | −5.93 | −1.0000 |
| S16 | Aspheric | −8.4071 | 0.0763 | | | | 0.5242 |
| S17 | Spherical | Infinite | 0.2100 | 1.52 | 64.2 | | |
| S18 | Spherical | Infinite | 0.2694 | | | | |
| S19 | Spherical | Infinite | | | | | |

TABLE 6-1

| Surface number | A4 | A6 | A8 | A10 | A12 | A14 | A16 |
|---|---|---|---|---|---|---|---|
| S1 | 2.0709E−03 | −7.2955E−03 | −3.9298E−03 | −1.5515E−03 | −5.1713E−04 | −1.4185E−04 | −2.4507E−05 |
| S2 | −6.0187E−03 | 4.9707E−03 | −2.8480E−04 | −7.0258E−04 | −1.3813E−04 | −4.0229E−05 | −5.1685E−05 |
| S3 | 6.1431E−02 | 1.9850E−02 | 1.5517E−03 | 2.6742E−04 | 1.0775E−04 | −2.0698E−04 | −2.5474E−04 |
| S4 | 1.1501E−01 | 2.6215E−02 | 1.5345E−03 | −6.0381E−04 | 2.0846E−04 | 6.3697E−04 | 4.4867E−04 |
| S5 | 5.3987E−03 | 4.3446E−02 | 7.8245E−03 | −8.0097E−04 | −3.4904E−04 | 6.1848E−04 | 5.9815E−04 |
| S6 | 2.5105E−02 | 3.6149E−02 | 1.2052E−02 | 3.6043E−03 | 1.0904E−03 | 3.2859E−04 | 8.5236E−05 |
| S7 | −2.5743E−01 | −1.4110E−02 | 1.4814E−03 | 1.3290E−03 | 8.9937E−04 | 4.8276E−04 | 2.4023E−04 |

TABLE 6-1-continued

| Surface number | A4 | A6 | A8 | A10 | A12 | A14 | A16 |
|---|---|---|---|---|---|---|---|
| S8 | −3.8078E−01 | −1.1956E−02 | 6.5027E−03 | 4.2802E−03 | 2.7411E−03 | 1.4799E−03 | 7.1772E−04 |
| S9 | −5.4318E−01 | −5.3785E−03 | −1.1667E−02 | −1.7808E−03 | −5.4648E−04 | 9.5980E−05 | 1.7692E−04 |
| S10 | −8.3243E−01 | 7.4970E−02 | 1.7720E−02 | 7.1843E−03 | −7.0988E−03 | −7.8514E−03 | −3.8973E−03 |
| S11 | −1.4283E+00 | 1.6701E−01 | 1.1325E−01 | 9.7952E−03 | −1.8893E−02 | −1.4777E−02 | −1.9438E−04 |
| S12 | −1.1176E+00 | 2.9041E−01 | −4.0788E−02 | −1.8845E−02 | 1.3819E−02 | 6.6527E−03 | −9.6622E−04 |
| S13 | −5.0578E+00 | 1.2197E+00 | −1.0353E−01 | −4.8823E−02 | 1.1408E−02 | −1.1881E−02 | 6.6617E−03 |
| S14 | −4.2161E+00 | 8.3946E−01 | −6.3105E−02 | 1.8750E−02 | 3.7358E−02 | −3.8305E−02 | −8.0075E−03 |
| S15 | 6.9533E+00 | −8.4031E−01 | 1.3587E−01 | −3.9128E−02 | 3.7715E−02 | −4.1295E−02 | 2.0130E−02 |
| S16 | 1.6666E+00 | −2.3380E−01 | 3.9348E−01 | −9.2794E−02 | 9.0539E−03 | −1.5993E−02 | 2.0667E−03 |

TABLE 6-2

| Surface number | A18 | A20 | A22 | A24 | A26 | A28 | A30 |
|---|---|---|---|---|---|---|---|
| S1 | 3.1031E−06 | 3.7780E−06 | 0.0000E+00 | 0.0000E+00 | 0.0000E+00 | 0.0000E+00 | 0.0000E+00 |
| S2 | −3.7067E−05 | −1.0554E−05 | 0.0000E+00 | 0.0000E+00 | 0.0000E+00 | 0.0000E+00 | 0.0000E+00 |
| S3 | −1.1720E−04 | −2.4501E−05 | 0.0000E+00 | 0.0000E+00 | 0.0000E+00 | 0.0000E+00 | 0.0000E+00 |
| S4 | 1.8650E−04 | 4.1700E−05 | 0.0000E+00 | 0.0000E+00 | 0.0000E+00 | 0.0000E+00 | 0.0000E+00 |
| S5 | 2.7905E−04 | 6.7064E−05 | 0.0000E+00 | 0.0000E+00 | 0.0000E+00 | 0.0000E+00 | 0.0000E+00 |
| S6 | 1.1479E−05 | 1.9124E−06 | 0.0000E+00 | 0.0000E+00 | 0.0000E+00 | 0.0000E+00 | 0.0000E+00 |
| S7 | 9.0136E−05 | 2.4698E−05 | 0.0000E+00 | 0.0000E+00 | 0.0000E+00 | 0.0000E+00 | 0.0000E+00 |
| S8 | 2.4351E−04 | 8.0073E−05 | 0.0000E+00 | 0.0000E+00 | 0.0000E+00 | 0.0000E+00 | 0.0000E+00 |
| S9 | 1.1233E−06 | 2.7933E−05 | 0.0000E+00 | 0.0000E+00 | 0.0000E+00 | 0.0000E+00 | 0.0000E+00 |
| S10 | −1.3174E−03 | −9.7735E−05 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−04 | −1.3720E−05 | −8.4025E−07 |
| S13 | 3.3959E−04 | −2.8985E−03 | 5.0489E−04 | 1.0468E−05 | 9.4446E−07 | 0.0000E+00 | 0.0000E+00 |
| S14 | −4.8132E−04 | 1.8971E−03 | 1.7124E−04 | 4.3785E−05 | 4.7923E−04 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 6A:
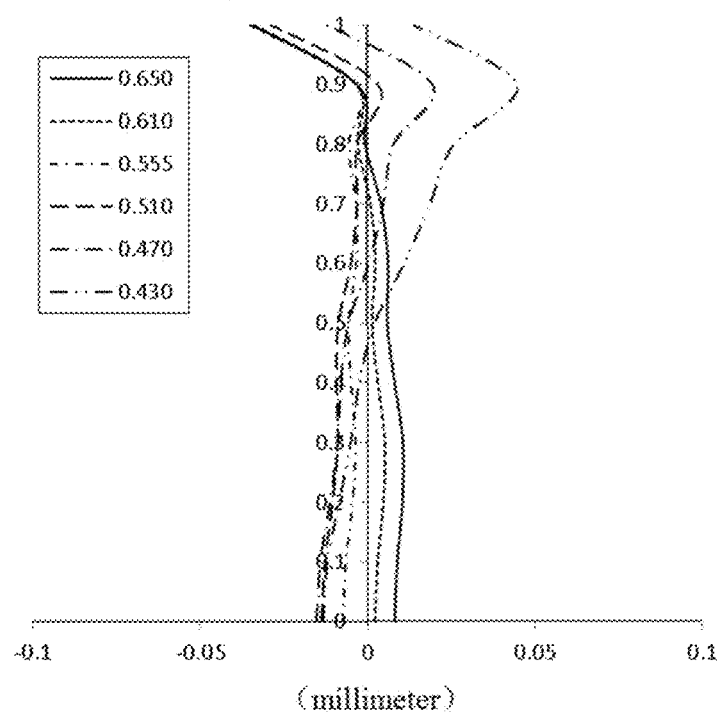
FIGS. 6A to 6C show a longitudinal aberration curve, an astigmatism curve and a lateral color curve of an optical imaging lens assembly according to embodiment 3 respectively.
Figure 6B:
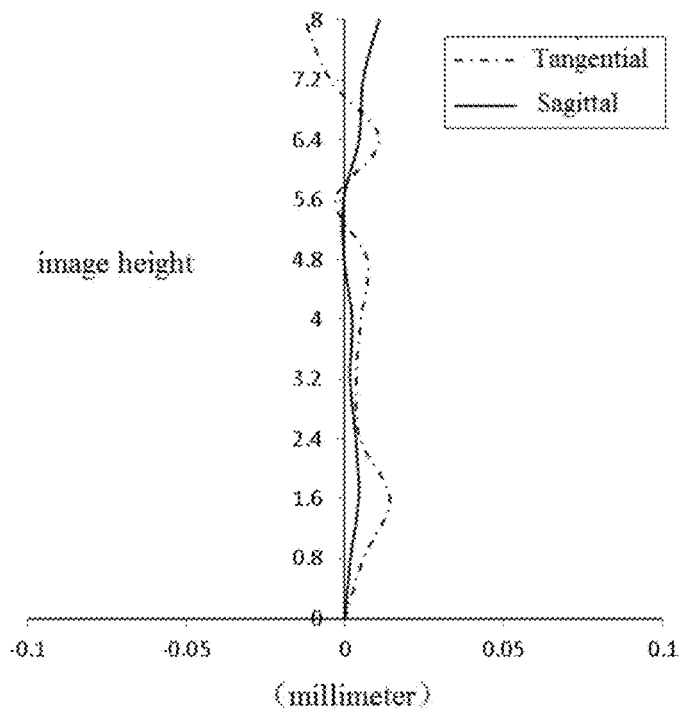
Figure 6C:
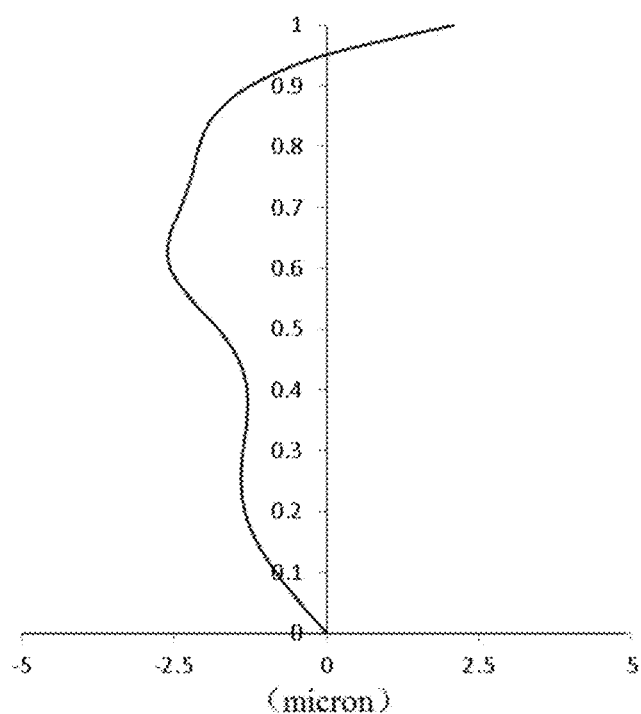

FIG. 6A shows a longitudinal aberration curve of the optical imaging lens assembly according to embodiment 3 to represent deviations of a convergence focal point after light with different wavelengths passes through the lens assembly. FIG. 6B shows an astigmatism curve of the optical imaging lens assembly according to embodiment 3 to represent a tangential image surface curvature and a sagittal image surface curvature. FIG. 6C shows a lateral color curve of the optical imaging lens assembly according to embodiment 3 to represent deviations of different image heights on the imaging surface after the light passes through the lens assembly. According to FIGS. 6A to 6C, it can be seen that the optical imaging lens assembly provided in embodiment 3 may achieve high imaging quality.

Embodiment 4

Figure 7:
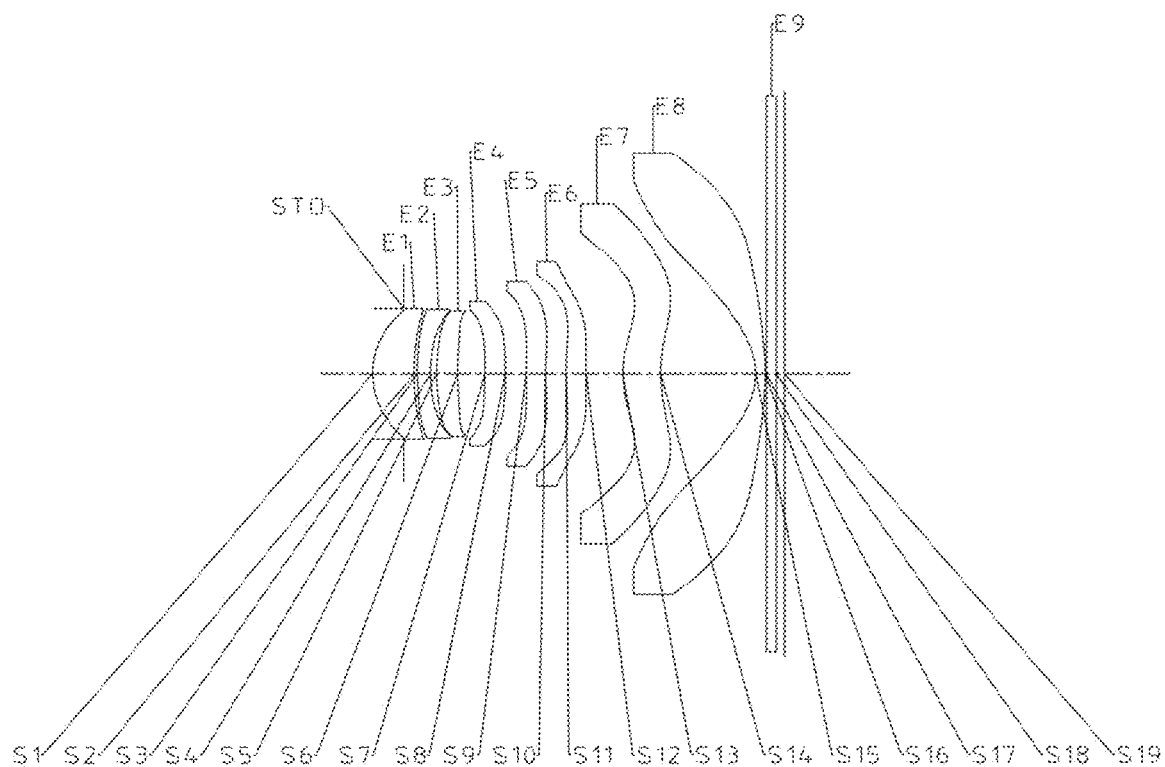
FIG. 7 is a structure diagram of an optical imaging lens assembly according to embodiment 4 of the disclosure.

An optical imaging lens according to embodiment 4 of the disclosure will be described below with reference to FIGS. 7 to 8C. FIG. 7 is a structure diagram of an optical imaging lens assembly according to embodiment 4 of the disclosure.

As shown in FIG. 7, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

In the example, a total effective focal length f of the optical imaging lens assembly is 7.26 mm. TTL is a total length of the optical imaging lens assembly, and TTL is 8.70 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly is 42.3°. f/EPD is a ratio of the total effective focal length f of the optical imaging lens assembly to an EPD of the optical imaging lens assembly, and f/EPD is 1.99.

Table 7 is a basic parameter table of the optical imaging lens assembly of embodiment 4, and units of the curvature radius, the thickness/distance and the focal length are all millimeter (mm). Tables 8-1 and 8-2 show high-order coefficients that can be used for each aspheric mirror surface in embodiment 4. A surface type of each aspheric surface may be defined by formula (1) given in embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6579 | | | | |
| S1 | Aspheric | 2.8798 | 0.8776 | 1.55 | 56.1 | 7.46 | 0.0459 |
| S2 | Aspheric | 8.7794 | 0.0688 | | | | 0.6946 |
| S3 | Aspheric | 11.1604 | 0.2765 | 1.67 | 19.2 | −15.51 | 0.2549 |
| S4 | Aspheric | 5.3567 | 0.1327 | | | | 0.1357 |
| S5 | Aspheric | 7.7524 | 0.4468 | 1.55 | 56.1 | 25.01 | 13.7702 |
| S6 | Aspheric | 17.5763 | 0.5755 | | | | 20.1232 |
| S7 | Aspheric | −43.2513 | 0.4250 | 1.57 | 38.0 | 21542.00 | 50.0000 |
| S8 | Aspheric | −43.2532 | 0.4438 | | | | 50.0000 |
| S9 | Aspheric | 26.0560 | 0.4104 | 1.67 | 19.2 | −36.14 | 35.5764 |
| S10 | Aspheric | 12.5367 | 0.4329 | | | | −41.7761 |
| S11 | Aspheric | 11.5936 | 0.4207 | 1.57 | 38.0 | 28.80 | −22.7843 |
| S12 | Aspheric | 38.9669 | 0.7761 | | | | −99.0000 |
| S13 | Aspheric | 3.8179 | 0.8010 | 1.55 | 56.1 | 17.85 | −2.5483 |
| S14 | Aspheric | 5.8118 | 2.0101 | | | | −2.4433 |
| S15 | Aspheric | −2.4449 | 0.2000 | 1.55 | 56.1 | −6.00 | −1.0000 |
| S16 | Aspheric | −9.9215 | 0.0250 | | | | 1.0412 |
| S17 | Spherical | Infinite | 0.2100 | 1.52 | 64.2 | | |
| S18 | Spherical | Infinite | 0.1693 | | | | |
| S19 | Spherical | Infinite | | | | | |

TABLE 8-1

| Surface number | A4 | A6 | A8 | A10 | A12 | A14 | A16 |
|---|---|---|---|---|---|---|---|
| S1 | 1.8058E−03 | −7.8347E−03 | −4.1150E−03 | −16323E−03 | −5.8281E−04 | −1.8682E−04 | −5.1492E−05 |
| S2 | −3.4332E−03 | 5.5025E−03 | −5.8027E−04 | −7.2444E−04 | −1.9795E−04 | 1.6189E−05 | −8.7526E−07 |
| S3 | 6.3026E−02 | 2.1016E−02 | 5.3818E−04 | 1.3091E−04 | 1.8903E−04 | 4.0644E−05 | −1.4484E−05 |
| S4 | 1.1419E−01 | 2.8620E−02 | 1.4116E−03 | −9.3877E−04 | −2.9924E−04 | 3.3211E−04 | 2.5856E−04 |
| S5 | 6.9405E−03 | 4.3639E−02 | 6.7368E−03 | −1.4550E−03 | −8.1067E−04 | 3.7919E−04 | 4.7234E−04 |
| S6 | 2.6953E−02 | 3.5265E−02 | 1.1290E−02 | 3.3433E−03 | 1.0015E−03 | 2.9772E−04 | 6.7488E−05 |
| S7 | −2.5971E−01 | −1.3673E−02 | 9.6991E−04 | 1.1291E−03 | 7.7563E−04 | 4.5356E−04 | 2.1672E−04 |
| S8 | −3.8921E−01 | −1.2063E−02 | 4.8795E−03 | 3.3412E−03 | 2.2106E−03 | 1.2601E−03 | 5.7721E−04 |
| S9 | −5.3309E−01 | −4.3753E−03 | −1.1195E−02 | −1.2900E−03 | −1.1121E−03 | −1.2239E−04 | −1.8098E−04 |
| S10 | −8.3981E−01 | 6.4574E−02 | 1.6611E−02 | 9.9287E−03 | −7.2408E−03 | −8.4943E−03 | −5.1947E−03 |
| S11 | −1.4283E+00 | 1.6701E−01 | 1.1325E−01 | 9.7952E−03 | −1.8893E−02 | −1.4777E−02 | −1.9438E−04 |
| S12 | −1.1176E+00 | 2.9041E−02 | −4.0788E−02 | −1.8845E−02 | 1.3819E−02 | 6.6527E−03 | −9.6622E−04 |
| S13 | −5.0578E+00 | 1.2197E+00 | −1.0353E−01 | −4.8823E−02 | 1.1408E−02 | −1.1881E−02 | 6.6617E−03 |
| S14 | −4.2161E+00 | 8.3946E−01 | −6.3105E−02 | 1.8750E−02 | 3.7358E−02 | −3.8305E−02 | −8.0075E−03 |
| S15 | 6.9533E+00 | −8.4031E−01 | 1.3587E−01 | −3.9128E−02 | 3.7715E−02 | −4.1295E−02 | 2.0130E−02 |
| S16 | 1.6666E+00 | −2.3380E−01 | 3.9348E−01 | −9.2794E−02 | 9.0539E−03 | −1.5993E−02 | 2.0667E−03 |

TABLE 8-2

| Surface number | A18 | A20 | A22 | A24 | A26 | A28 | A30 |
|---|---|---|---|---|---|---|---|
| S1 | −1.0109E−05 | −1.5442E−06 | 0.0000E+00 | 0.0000E+00 | 0.0000E+00 | 0.0000E+00 | 0.0000E+00 |
| S2 | −4.5288E−06 | −4.3752E−06 | 0.0000E+00 | 0.0000E+00 | 0.0000E+00 | 0.0000E+00 | 0.0000E+00 |
| S3 | −8.1795E−05 | −2.6045E−05 | 0.0000E+00 | 0.0000E+00 | 0.0000E+00 | 0.0000E+00 | 0.0000E+00 |
| S4 | 1.0376E−04 | 1.4722E−05 | 0.0000E+00 | 0.0000E+00 | 0.0000E+00 | 0.0000E+00 | 0.0000E+00 |
| S5 | 2.2621E−04 | 4.9232E−05 | 0.0000E+00 | 0.0000E+00 | 0.0000E+00 | 0.0000E+00 | 0.0000E+00 |
| S6 | 6.1015E−06 | −6.6716E−07 | 0.0000E+00 | 0.0000E+00 | 0.0000E+00 | 0.0000E+00 | 0.0000E+00 |
| S7 | 8.9759E−05 | 2.2644E−05 | 0.0000E+00 | 0.0000E+00 | 0.0000E+00 | 0.0000E+00 | 0.0000E+00 |
| S8 | 2.0357E−04 | 6.3582E−05 | 0.0000E+00 | 0.0000E+00 | 0.0000E+00 | 0.0000E+00 | 0.0000E+00 |
| S9 | −1.0544E−04 | −3.9981E−05 | 0.0000E+00 | 0.0000E+00 | 0.0000E+00 | 0.0000E+00 | 0.0000E+00 |
| S10 | −1.9123E−03 | −3.6289E−04 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−05 | −1.3720E−05 | −8.4025E−07 |
| S13 | 3.3959E−04 | −2.8985E−03 | 5.0489E−04 | 1.0468E−03 | 9.4446E−07 | 0.0000E+00 | 0.0000E+00 |
| S14 | −4.8132E−04 | 1.8971E−03 | 1.7124E−04 | 4.3785E−05 | 4.7923E−04 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 8A:
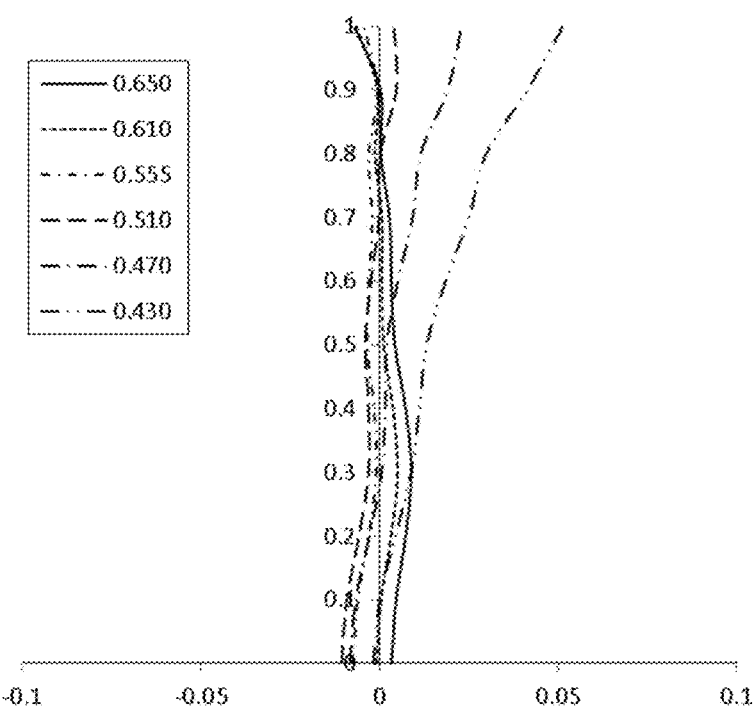
FIGS. 8A to 8C show a longitudinal aberration curve, an astigmatism curve and a lateral color curve of an optical imaging lens assembly according to embodiment 4 respectively.
Figure 8B:
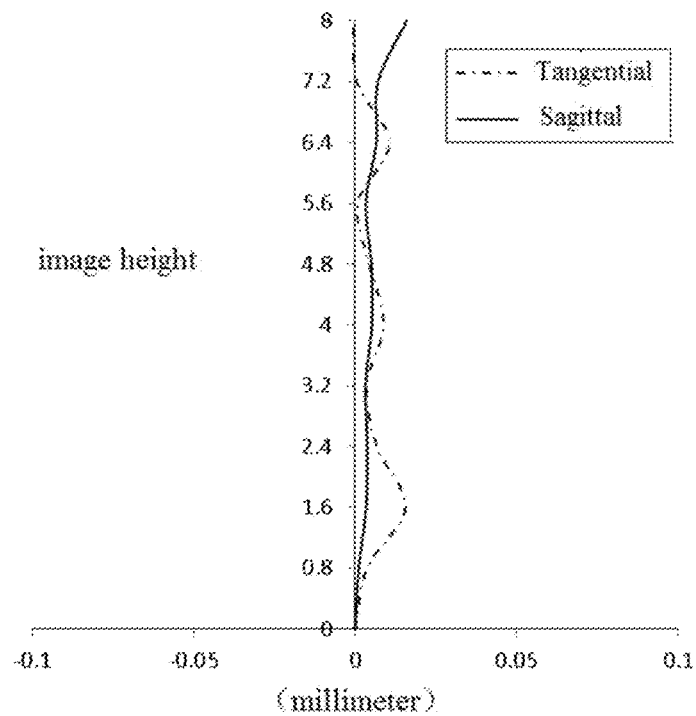
Figure 8C:
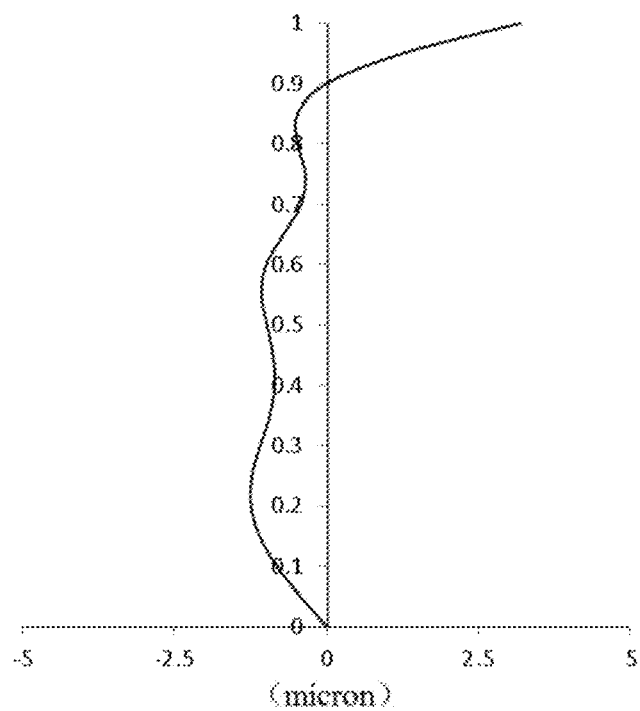

FIG. 8A shows a longitudinal aberration curve of the optical imaging lens assembly according to embodiment 4 to represent deviations of a convergence focal point after light with different wavelengths passes through the lens assembly. FIG. 8B shows an astigmatism curve of the optical imaging lens assembly according to embodiment 4 to represent a tangential image surface curvature and a sagittal image surface curvature. FIG. 8C shows a lateral color curve of the optical imaging lens assembly according to embodiment 4 to represent deviations of different image heights on the imaging surface after the light passes through the lens assembly. According to FIGS. 8A to 8C, it can be seen that the optical imaging lens assembly provided in embodiment 4 may achieve high imaging quality.

Embodiment 5

Figure 9:
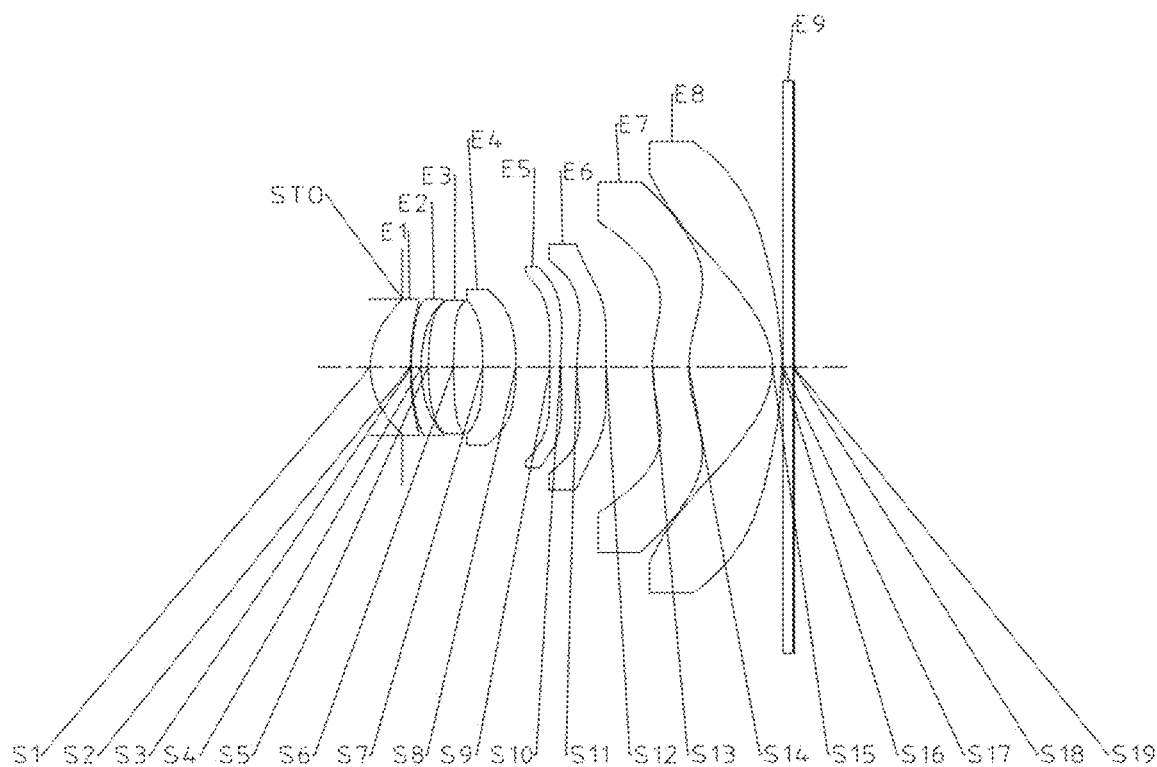
FIG. 9 is a structure diagram of an optical imaging lens assembly according to embodiment 5 of the disclosure.

An optical imaging lens according to embodiment 5 of the disclosure will be described below with reference to FIGS. 9 to 10C. FIG. 9 is a structure diagram of an optical imaging lens assembly according to embodiment 5 of the disclosure.

As shown in FIG. 9, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to 518 and is finally imaged on the imaging surface S19.

In the example, a total effective focal length f of the optical imaging lens assembly is 7.47 mm. TTL is a total length of the optical imaging lens assembly, and TTL is 8.99 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly is 41.6°. f/EPD is a ratio of the total effective focal length f of the optical imaging lens assembly to an EPD of the optical imaging lens assembly, and f/EPD is 1.99.

Table 9 is a basic parameter table of the optical imaging lens assembly of embodiment 5, and units of the curvature radius, the thickness/distance and the focal length are all millimeter (mm). Tables 10-1 and 10-2 show high-order coefficients that can be used for each aspheric mirror surface in embodiment 5. A surface type of each aspheric surface may be defined by formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6721 | | | | |
| S1 | Aspheric | 2.9325 | 0.8472 | 1.55 | 56.1 | 7.46 | 0.0074 |
| S2 | Aspheric | 9.3995 | 0.0250 | | | | 0.7088 |
| S3 | Aspheric | 10.1377 | 0.2000 | 1.67 | 19.2 | −15.40 | 2.9034 |
| S4 | Aspheric | 5.0985 | 0.1515 | | | | −0.1930 |
| S5 | Aspheric | 7.8187 | 0.5367 | 1.55 | 56.1 | 30.23 | 13.6421 |
| S6 | Aspheric | 14.4978 | 0.6208 | | | | 29.9602 |
| S7 | Aspheric | −23.8679 | 0.7034 | 1.57 | 38.0 | 45.59 | −77.2082 |
| S8 | Aspheric | −12.5732 | 0.7254 | | | | 20.3722 |
| S9 | Aspheric | 36.3766 | 0.2239 | 1.67 | 19.2 | −20.62 | 10.9826 |
| S10 | Aspheric | 10.0621 | 0.3443 | | | | −89.6599 |
| S11 | Aspheric | 6.9035 | 0.6249 | 1.57 | 38.0 | 13.58 | −68.4548 |
| S12 | Aspheric | 61.7455 | 0.9808 | | | | −99.0000 |
| S13 | Aspheric | 4.9383 | 0.7712 | 1.55 | 56.1 | −170.09 | −6.8990 |
| S14 | Aspheric | 4.4304 | 1.7754 | | | | −9.6361 |
| S15 | Aspheric | −2.6553 | 0.2000 | 1.55 | 56.1 | −6.60 | −1.0000 |
| S16 | Aspheric | −10.3485 | 0.0250 | | | | 0.9499 |
| S17 | Spherical | Infinite | 0.2100 | 1.52 | 64.2 | | |
| S18 | Spherical | Infinite | 0.0250 | | | | |
| S19 | Spherical | Infinite | | | | | |

TABLE 10-1

| Surface number | A4 | A6 | A8 | A10 | A12 | A14 | A16 |
|---|---|---|---|---|---|---|---|
| S1 | −3.9263E−03 | −9.5788E−03 | −4.2314E−03 | −1.5199E−03 | −4.6945E−04 | −1.4336E−04 | −3.2996E−05 |
| S2 | −3.3497E−03 | 5.1271E−03 | −5.4013E−04 | −5.8266E−04 | −4.3081E−04 | 9.7330E−05 | −6.5047E−05 |
| S3 | 6.7634E−02 | 1.7523E−02 | 8.7155E−05 | −6.1292E−04 | −8.5074E−04 | −1.1470E−04 | −2.9322E−04 |
| S4 | 1.1022E−01 | 2.6953E−02 | 1.6540E−03 | −1.9099E−04 | −5.0538E−04 | 5.5531E−05 | −9.0506E−06 |
| S5 | 5.9855E−03 | 4.2821E−02 | 2.9366E−03 | −1.7352E−03 | −9.4914E−04 | −3.5043E−05 | 8.1626E−05 |
| S6 | 3.1326E−02 | 3.4458E−02 | 7.2891E−03 | 1.5786E−03 | 3.6939E−04 | 7.2884E−05 | −4.3243E−06 |
| S7 | −2.4685E−01 | −7.7482E−03 | 1.2447E−03 | 7.5546E−04 | 5.4164E−04 | 2.7435E−04 | 1.2999E−04 |
| S8 | −3.4439E−01 | −6.0520E−03 | 3.3387E−03 | 7.7758E−04 | 9.0051E−04 | 4.6107E−04 | 2.0152E−04 |
| S9 | −4.9253E−01 | 1.3152E−02 | −6.3134E−03 | 5.7154E−04 | −1.4753E−03 | 1.1403E−03 | −1.0481E−04 |
| S10 | −8.5059E−01 | 6.7009E−02 | 5.5104E−03 | 1.7646E−02 | −4.4453E−03 | −6.1990E−03 | −8.2689E−03 |
| S11 | −1.4283E+00 | 1.6701E−01 | 1.1325E−01 | 9.7952E−03 | −1.8893E−02 | −1.4777E−02 | −1.9438E−04 |
| S12 | −1.1176E+00 | 2.9041E−01 | −4.0788E−02 | −1.8845E−02 | 1.3819E−02 | 6.6527E−03 | −9.6622E−04 |
| S13 | −5.0578E+00 | 1.2197E+00 | −1.0353E−01 | −4.8823E−02 | 1.1408E−02 | −1.1881E−02 | 6.6617E−03 |
| S14 | −4.2161E+00 | 8.3946E−01 | −6.3105E−02 | 1.8750E−02 | 3.7358E−02 | −3.8305E−02 | −8.0075E−03 |
| S15 | 6.9533E+00 | −8.4031E−01 | 1.3587E−01 | −3.9128E−02 | 3.7715E−02 | −4.1295E−02 | 2.0130E−02 |
| S16 | 1.6666E+00 | −2.3380E−01 | 3.9348E−01 | −9.2794E−02 | 9.0539E−03 | −1.5993E−02 | 2.0667E−03 |

TABLE 10-2

| Surface number | A18 | A20 | A22 | A24 | A26 | A28 | A30 |
|---|---|---|---|---|---|---|---|
| S1 | −6.1030E−06 | 2.1102E−06 | 0.0000E+00 | 0.0000E+00 | 0.0000E+00 | 0.0000E+00 | 0.0000E+00 |
| S2 | 3.0729E−07 | −1.7428E−07 | 0.0000E+00 | 0.0000E+00 | 0.0000E+00 | 0.0000E+00 | 0.0000E+00 |
| S3 | −2.9405E−05 | −1.1816E−05 | 0.0000E+00 | 0.0000E+00 | 0.0000E+00 | 0.0000E+00 | 0.0000E+00 |
| S4 | 8.5239E−06 | −3.7071E−06 | 0.0000E+00 | 0.0000E+00 | 0.0000E+00 | 0.0000E+00 | 0.0000E+00 |
| S5 | 4.4315E−05 | 8.3223E−06 | 0.0000E+00 | 0.0000E+00 | 0.0000E+00 | 0.0000E+00 | 0.0000E+00 |
| S6 | −1.6052E−05 | −5.7636E−06 | 0.0000E+00 | 0.0000E+00 | 0.0000E+00 | 0.0000E+00 | 0.0000E+00 |
| S7 | 4.2336E−05 | 1.2916E−05 | 0.0000E+00 | 0.0000E+00 | 0.0000E+00 | 0.0000E+00 | 0.0000E+00 |
| S8 | 5.3006E−05 | 2.1765E−05 | 0.0000E+00 | 0.0000E+00 | 0.0000E+00 | 0.0000E+00 | 0.0000E+00 |
| S9 | 1.3752E−04 | −6.0631E−05 | 0.0000E+00 | 0.0000E+00 | 0.0000E+00 | 0.0000E+00 | 0.0000E+00 |
| S10 | −3.1082E−03 | −1.2352E−03 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−04 | −1.3720E−05 | −8.4025E−07 |
| S13 | 3.3959E−04 | −2.8985E−03 | 5.0489E−04 | 1.0468E−03 | 9.4446E−07 | 0.0000E+00 | 0.0000E+00 |
| S14 | −4.8132E−04 | 1.8971E−03 | 1.7124E−04 | 4.3785E−05 | 4.7923E−04 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 10A:
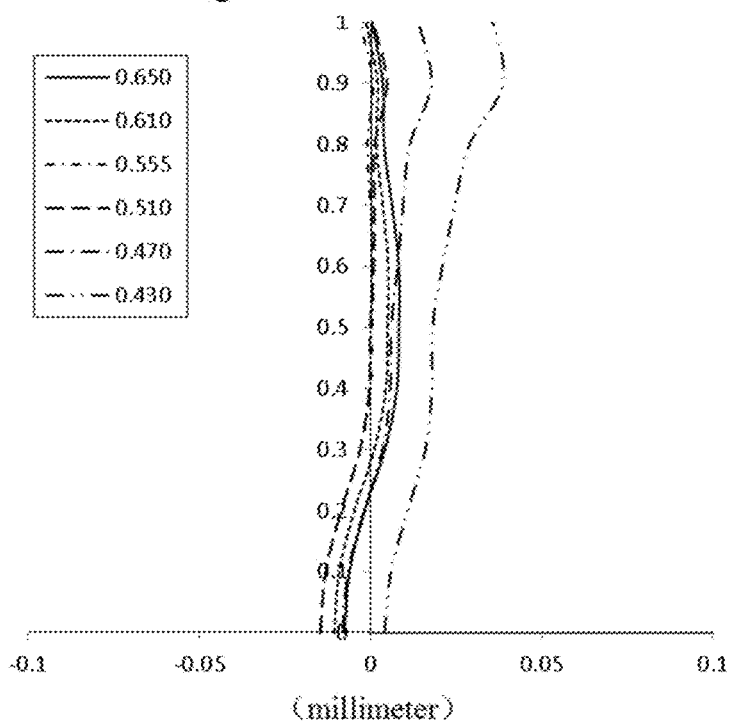
FIGS. 10A to 10C show a longitudinal aberration curve, an astigmatism curve and a lateral color curve of an optical imaging lens assembly according to embodiment 5 respectively.
Figure 10B:
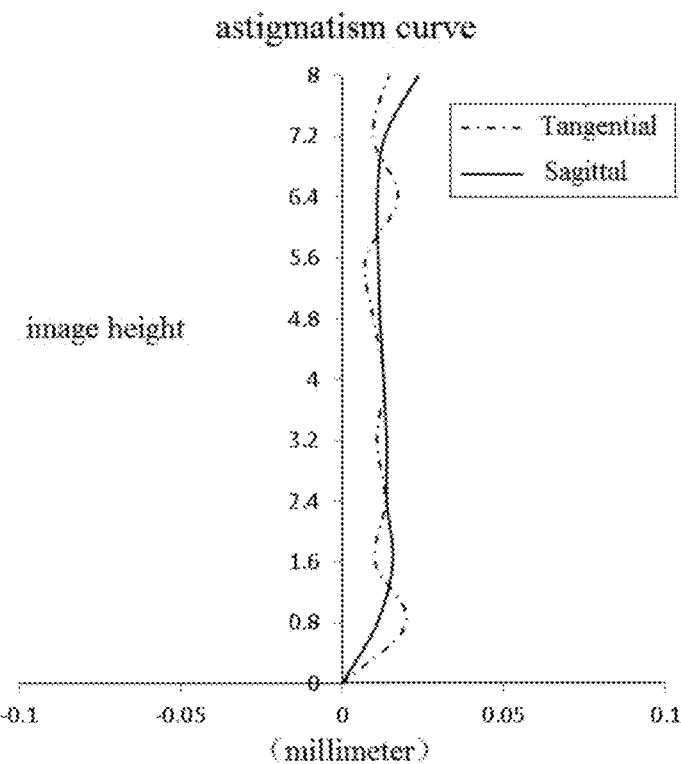
Figure 10C:
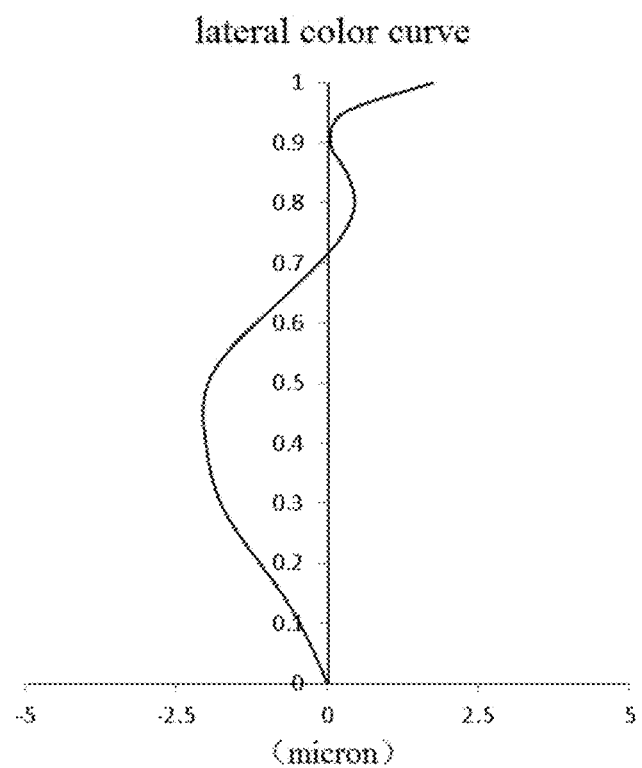

FIG. 10A shows a longitudinal aberration curve of the optical imaging lens assembly according to embodiment 5 to represent deviations of a convergence focal point after light with different wavelengths passes through the lens assembly. FIG. 10B shows an astigmatism curve of the optical imaging lens assembly according to embodiment 5 to represent a tangential image surface curvature and a sagittal image surface curvature. FIG. 10C shows a lateral color curve of the optical imaging lens assembly according to embodiment 5 to represent deviations of different image heights on the imaging surface after the light passes through the lens assembly. According to FIGS. 10A to 10C, it can be seen that the optical imaging lens assembly provided in embodiment 5 may achieve high imaging quality.

Embodiment 6

Figure 11:
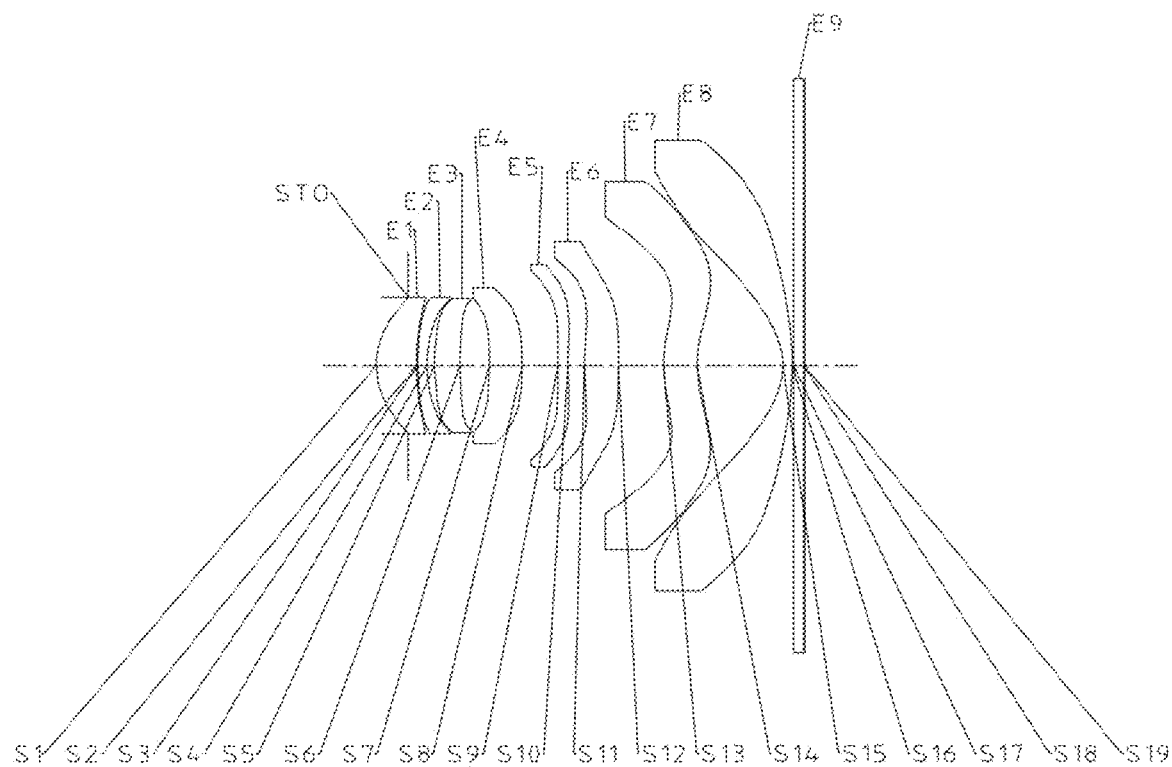
FIG. 11 is a structure diagram of an optical imaging lens assembly according to embodiment 6 of the disclosure.

An optical imaging lens assembly according to embodiment 6 of the disclosure will be described below with reference to FIGS. 11 to 12C. FIG. 11 is a structure diagram of an optical imaging lens assembly according to embodiment 6 of the disclosure.

As shown in FIG. 11, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

In the example, a total effective focal length f of the optical imaging lens assembly is 7.46 mm. TTL is a total length of the optical imaging lens assembly, and TTL is 9.00 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly is 41.9°. f/EPD is a ratio of the total effective focal length f of the optical imaging lens assembly to an EPD of the optical imaging lens assembly, and f/EPD is 1.99.

Table 11 is a basic parameter table of the optical imaging lens assembly of embodiment 6, and units of the curvature radius, the thickness/distance and the focal length are all millimeter (mm). Tables 12-1 and 12-2 show high-order coefficients that can be used for each aspheric mirror surface in embodiment 6. A surface type of each aspheric surface may be defined by formula (1) given in embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6706 | | | | |
| S1 | Aspheric | 2.9308 | 0.8450 | 1.55 | 56.1 | 7.49 | 0.0045 |
| S2 | Aspheric | 9.3051 | 0.0250 | | | | 0.5245 |
| S3 | Aspheric | 10.0704 | 0.2000 | 1.67 | 19.2 | −15.55 | 2.9648 |
| S4 | Aspheric | 5.1050 | 0.1542 | | | | −0.2075 |
| S5 | Aspheric | 7.8241 | 0.5366 | 1.55 | 56.1 | 30.64 | 13.6343 |
| S6 | Aspheric | 14.3443 | 0.6177 | | | | 30.0109 |
| S7 | Aspheric | −24.0578 | 0.6888 | 1.57 | 38.0 | 42.10 | −86.8708 |
| S8 | Aspheric | −12.1373 | 0.7525 | | | | 19.1548 |
| S9 | Aspheric | 44.2902 | 0.2080 | 1.67 | 19.2 | −20.15 | −99.0000 |
| S10 | Aspheric | 10.4107 | 0.3450 | | | | −99.0000 |
| S11 | Aspheric | 8.1698 | 0.7148 | 1.57 | 38.0 | 13.28 | −99.0000 |
| S12 | Aspheric | −100.0000 | 0.9452 | | | | −99.0000 |
| S13 | Aspheric | 4.7755 | 0.7029 | 1.55 | 56.1 | −200.81 | −6.3831 |
| S14 | Aspheric | 4.3383 | 1.8042 | | | | −9.3969 |
| S15 | Aspheric | −2.5209 | 0.2000 | 1.55 | 56.1 | −6.30 | −1.0000 |
| S16 | Aspheric | −9.7066 | 0.0250 | | | | 0.6099 |
| S17 | Spherical | Infinite | 0.2100 | 1.52 | 64.2 | | |
| S18 | Spherical | Infinite | 0.0250 | | | | |
| S19 | Spherical | Infinite | | | | | |

TABLE 12-1

| Surface number | A4 | A6 | A8 | A10 | A12 | A14 | A16 |
|---|---|---|---|---|---|---|---|
| S1 | −4.3175E−03 | −9.6708E−03 | −4.2476E−03 | −1.5246E−03 | −4.6418E−04 | −1.3945E−04 | −3.0208E−05 |
| S2 | −3.6464E−03 | 4.8424E−03 | −5.7028E−04 | −6.1870E−04 | −4.4147E−04 | 1.0527E−04 | −5.6780E−05 |
| S3 | 6.7786E−02 | 1.7286E−02 | 6.9164E−05 | −5.9207E−04 | −7.8676E−04 | −4.9986E−05 | −2.6774E−04 |
| S4 | 1.1006E−01 | 2.6767E−02 | 1.4622E−03 | −2.0295E−04 | −4.6288E−04 | 9.3536E−05 | 7.2539E−07 |
| S5 | 6.0216E−03 | 4.2698E−02 | 2.7152E−03 | −1.6855E−03 | −8.5813E−04 | 3.6383E−06 | 8.0257E−05 |
| S6 | 3.1554E−02 | 3.4316E−02 | 7.1241E−03 | 1.5547E−03 | 3.9235E−04 | 9.1351E−05 | 3.0871E−06 |
| S7 | −2.4655E−01 | −8.1390E−03 | 1.0076E−03 | 6.7429E−04 | 5.5570E−04 | 3.0091E−04 | 1.5352E−04 |
| S8 | −3.3771E−01 | −6.0578E−03 | 3.8103E−03 | 1.1723E−03 | 1.2646E−03 | 6.6299E−04 | 3.1427E−04 |
| S9 | −5.0440E−01 | 1.3814E−02 | −5.2561E−03 | −5.3009E−05 | −1.5700E−03 | 1.1014E−03 | −9.3111E−05 |
| S10 | −8.7826E−01 | 7.0699E−02 | 8.7385E−03 | 1.5958E−02 | −3.2808E−03 | −5.8621E−03 | −8.0177E−03 |
| S11 | −1.4283E−00 | 1.6701E−01 | 1.1325E−01 | 9.7952E−03 | −1.8893E−02 | −1.4777E−02 | −1.9438E−04 |
| S12 | −1.1176E−00 | 2.9041E−01 | −4.0788E−02 | −1.8845E−02 | 1.3819E−02 | 6.6527E−03 | −9.6622E−04 |
| S13 | −5.0578E−00 | 1.2197E−00 | −1.0353E−01 | −4.8823E−02 | 1.1408E−02 | −1.1881E−02 | 6.6617E−03 |
| S14 | −4.2161E−00 | 8.3946E−01 | −6.3105E−02 | 1.8750E−02 | 3.7358E−02 | −3.8305E−02 | −8.0075E−03 |
| S15 | 6.9533E−00 | −8.4031E−01 | 1.3587E−01 | −3.9128E−02 | 3.7715E−02 | −4.1295E−02 | 2.0130E−02 |
| S16 | 1.6666E−00 | −2.3380E−01 | 3.9348E−01 | −9.2794E−02 | 9.0539E−03 | −1.5993E−02 | 2.0667E−03 |

TABLE 12-2

| Surface number | A18 | A20 | A22 | A24 | A26 | A28 | A30 |
|---|---|---|---|---|---|---|---|
| S1 | −5.4472E−06 | 2.0934E−06 | 0.0000E+00 | 0.0000E+00 | 0.0000E+00 | 0.0000E+00 | 0.0000E+00 |
| S2 | −1.6055E−06 | −4.9792E−08 | 0.0000E+00 | 0.0000E+00 | 0.0000E+00 | 0.0000E+00 | 0.0000E+00 |
| S3 | −2.3679E−05 | −5.8357E−06 | 0.0000E+00 | 0.0000E+00 | 0.0000E+00 | 0.0000E+00 | 0.0000E+00 |
| S4 | 1.1146E−05 | −9.2672E−07 | 0.0000E+00 | 0.0000E+00 | 0.0000E+00 | 0.0000E+00 | 0.0000E+00 |
| S5 | 3.8650E−05 | 7.5657E−06 | 0.0000E+00 | 0.0000E+00 | 0.0000E+00 | 0.0000E+00 | 0.0000E+00 |
| S6 | −1.4788E−05 | −5.3393E−06 | 0.0000E+00 | 0.0000E+00 | 0.0000E+00 | 0.0000E+00 | 0.0000E+00 |
| S7 | 5.4158E−05 | 1.6985E−05 | 0.0000E+00 | 0.0000E+00 | 0.0000E+00 | 0.0000E+00 | 0.0000E+00 |
| S8 | 9.8029E−05 | 4.0127E−05 | 0.0000E+00 | 0.0000E+00 | 0.0000E+00 | 0.0000E+00 | 0.0000E+00 |
| S9 | 1.3606E−04 | −4.8316E−05 | 0.0000E+00 | 0.0000E+00 | 0.0000E+00 | 0.0000E+00 | 0.0000E+00 |
| S10 | −2.9791E−03 | −1.1780E−03 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−04 | −1.3720E−05 | −8.4025E−07 |
| S13 | 3.3959E−04 | −2.8985E−03 | 5.0489E−04 | 1.0468E−05 | 9.4446E−07 | 0.0000E+00 | 0.0000E+00 |
| S14 | −4.8132E−04 | 1.8971E−03 | 1.7124E−04 | 4.3785E−05 | 4.7923E−06 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 12A:
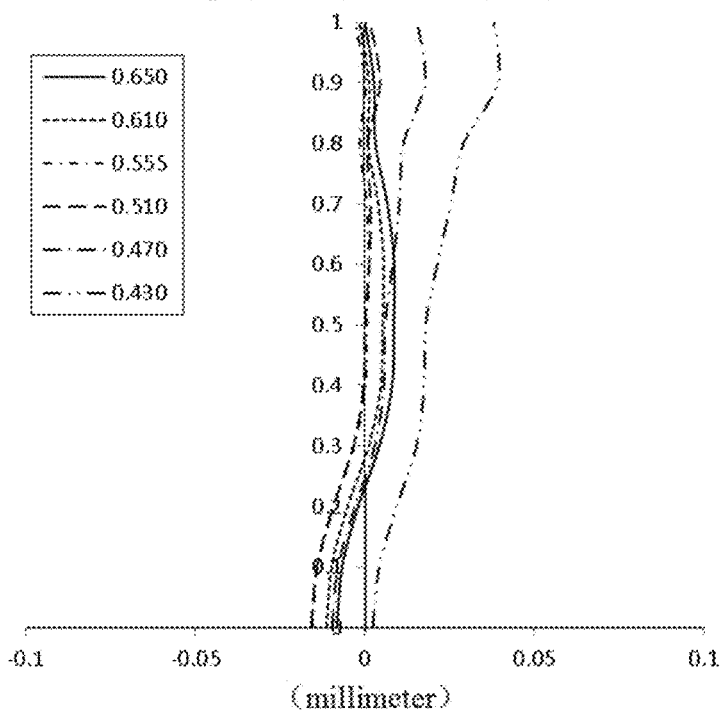
FIGS. 12A to 12C show a longitudinal aberration curve, an astigmatism curve and a lateral color curve of an optical imaging lens assembly according to embodiment 6 respectively.
Figure 12B:
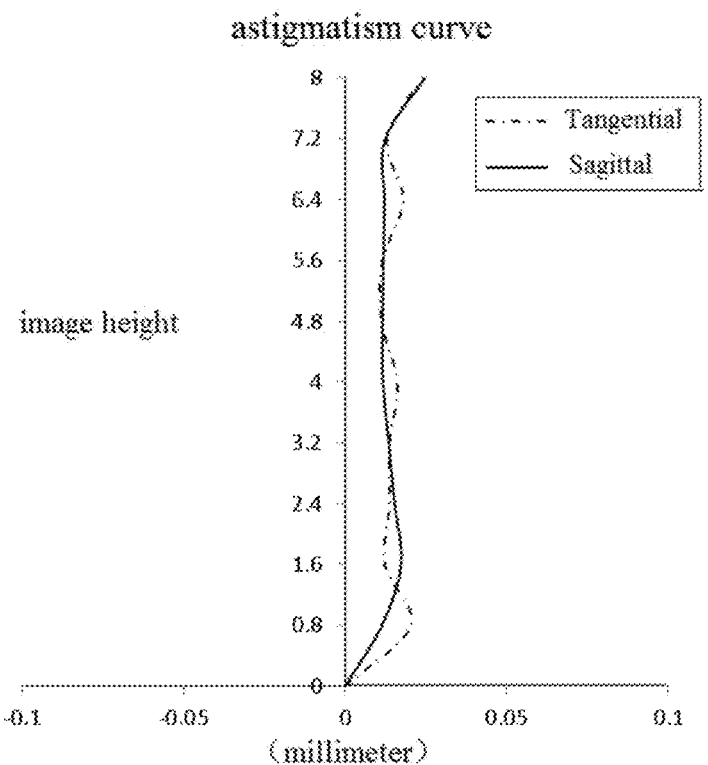
Figure 12C:
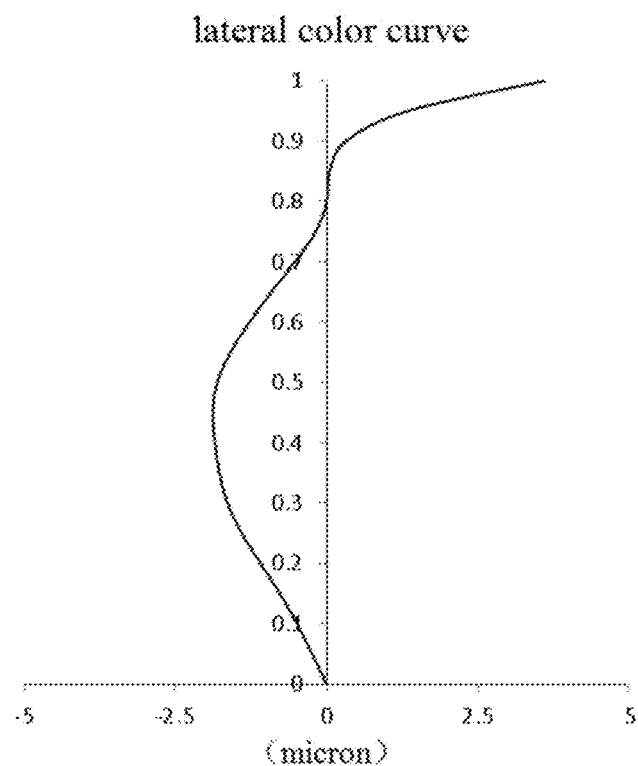

FIG. 12A shows a longitudinal aberration curve of the optical imaging lens assembly according to embodiment 6 to represent deviations of a convergence focal point after light with different wavelengths passes through the lens assembly. FIG. 12B shows an astigmatism curve of the optical imaging lens assembly according to embodiment 6 to represent a tangential image surface curvature and a sagittal image surface curvature. FIG. 12C shows a lateral color curve of the optical imaging lens assembly according to embodiment 6 to represent deviations of different image heights on the imaging surface after the light passes through the lens assembly. According to FIGS. 12A to 12C, it can be seen that the optical imaging lens assembly provided in embodiment 6 may achieve high imaging quality.

Embodiment 7

Figure 13:
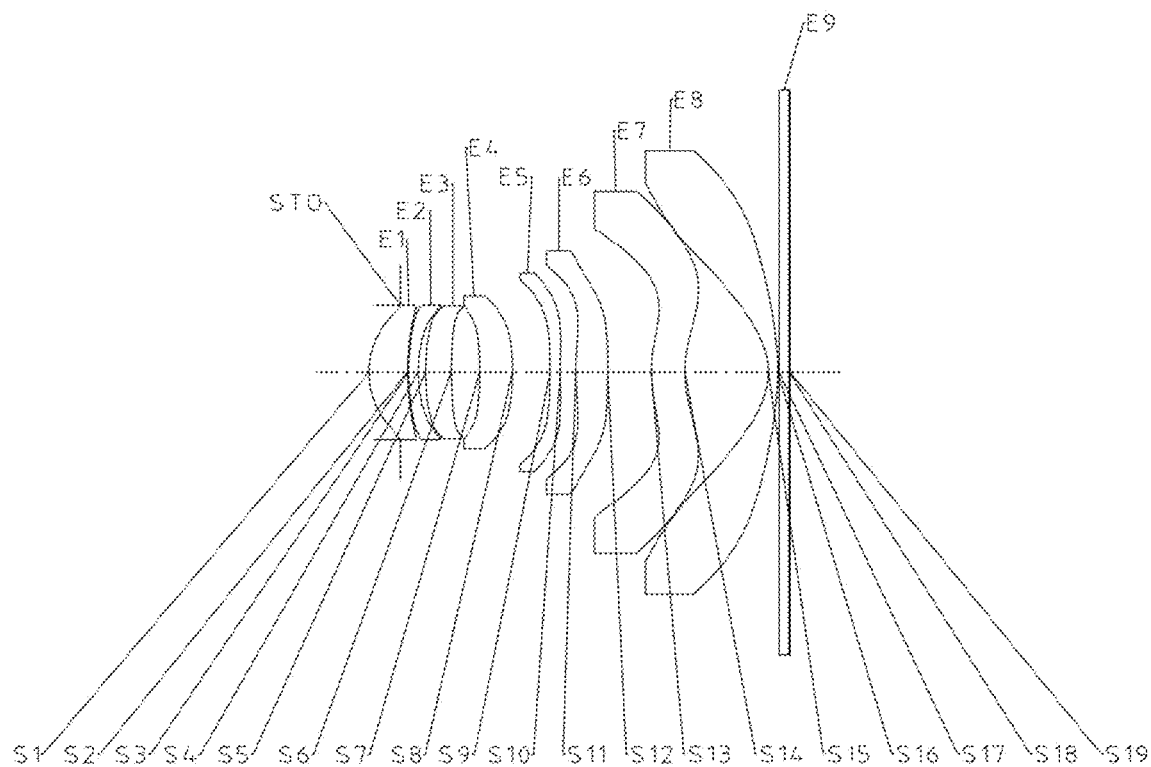
FIG. 13 is a structure diagram of an optical imaging lens assembly according to embodiment 7 of the disclosure.

An optical imaging lens assembly according to embodiment 7 of the disclosure will be described below with reference to FIGS. 13 to 14C. FIG. 13 is a structure diagram of an optical imaging lens assembly according to embodiment 7 of the disclosure.

As shown in FIG. 13, the optical imaging lens assembly sequentially includes, from an object side to an image side, a diaphragm STO, a first lens E1, a second lens E2, a third lens E3, a fourth lens E4, a fifth lens E5, a sixth lens E6, a seventh lens E7, an eighth lens E8, an optical filter E9, and an imaging surface S19.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a negative refractive power, an object-side surface S9 thereof is a concave surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a convex surface, while an image-side surface S14 is a concave surface. The eighth lens E8 has a negative refractive power, an object-side surface S15 thereof is a concave surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

In the example, a total effective focal length f of the optical imaging lens assembly is 7.46 mm. TTL is a total length of the optical imaging lens assembly, and TTL is 9.00 mm. ImgH is a half of a diagonal length of an effective pixel region on the imaging surface S19 of the optical imaging lens assembly, and ImgH is 8.00 mm. Semi-FOV is a half of a maximum field of view of the optical imaging lens assembly is 41.8°. f/EPD is a ratio of the total effective focal length f of the optical imaging lens assembly to an EPD of the optical imaging lens assembly, and f/EPD is 1.99.

Table 13 is a basic parameter table of the optical imaging lens assembly of embodiment 7, and units of the curvature radius, the thickness/distance and the focal length are all millimeter (mm). Tables 14-1 and 14-2 show high-order coefficients that can be used for each aspheric mirror surface in embodiment 7. A surface type of each aspheric surface may be defined by formula (1) given in embodiment 1.

TABLE 13

| Surface number | Surface type | Curvature radius | Thickness/ distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −0.6698 | | | | |
| S1 | Aspheric | 2.9267 | 0.8278 | 1.55 | 56.1 | 7.51 | −0.0015 |
| S2 | Aspheric | 9.2136 | 0.0250 | | | | 0.0638 |

TABLE 13-continued

| Surface number | Surface type | Curvature radius | Thickness/ distance | Material Refractive index | Abbe number | Focal length | Conic coefficient |
|---|---|---|---|---|---|---|---|
| S3 | Aspheric | 10.3710 | 0.2000 | 1.67 | 19.2 | −15.65 | 3.0564 |
| S4 | Aspheric | 5.1996 | 0.1592 | | | | −0.2302 |
| S5 | Aspheric | 7.8424 | 0.5487 | 1.55 | 56.1 | 31.61 | 13.6080 |
| S6 | Aspheric | 14.0199 | 0.6066 | | | | 29.8632 |
| S7 | Aspheric | −24.5364 | 0.7017 | 1.57 | 38.0 | 35.64 | −75.9649 |
| S8 | Aspheric | −11.2283 | 0.8026 | | | | 17.9377 |
| S9 | Aspheric | −100.0000 | 0.2195 | 1.67 | 19.2 | −19.13 | 50.0000 |
| S10 | Aspheric | 14.8933 | 0.3272 | | | | −99.0000 |
| S11 | Aspheric | 7.9539 | 0.6849 | 1.57 | 38.0 | 12.96 | −97.9114 |
| S12 | Aspheric | −100.0000 | 0.9305 | | | | 50.0000 |
| S13 | Aspheric | 4.8964 | 0.7169 | 1.55 | 56.1 | −99.89 | −6.1945 |
| S14 | Aspheric | 4.2607 | 1.7893 | | | | −9.0495 |
| S15 | Aspheric | −2.5366 | 0.2000 | 1.55 | 56.1 | −6.40 | −1.0000 |
| S16 | Aspheric | −9.4966 | 0.0250 | | | | 0.1872 |
| S17 | Spherical | Infinite | 0.2100 | 1.52 | 64.2 | | |
| S18 | Spherical | Infinite | 0.0250 | | | | |
| S19 | Spherical | Infinite | | | | | |

TABLE 14-1

| Surface number | A4 | A6 | A8 | A10 | A12 | A14 | A16 |
|---|---|---|---|---|---|---|---|
| S1 | −5.0053E−03 | −1.0125E−02 | −4.4484E−03 | −1.6029E−03 | −4.8894E−04 | −1.4381E−04 | −3.0835E−05 |
| S2 | −4.4175E−03 | 4.2789E−03 | −5.6193E−04 | −6.5871E−04 | −4.5864E−04 | 1.0950E−04 | −5.1186E−05 |
| S3 | 6.8018E−02 | 1.6813E−02 | 1.2768E−04 | −5.2079E−04 | −7.2675E−04 | 8.5512E−06 | −2.3361E−04 |
| S4 | 1.0983E−01 | 2.6238E−02 | 1.0324E−03 | −2.0585E−04 | −3.9875E−04 | 1.1292E−04 | −7.5816E−06 |
| S5 | 6.0257E−02 | 4.2330E−02 | 2.2986E−03 | −1.6459E−03 | −7.3691E−04 | 3.5897E−05 | 6.0019E−05 |
| S6 | 3.1540E−02 | 3.4178E−02 | 6.9665E−03 | 1.4886E−03 | 3.7536E−04 | 8.8605E−05 | 3.5116E−06 |
| S7 | −2.4724E−01 | −8.1737E−03 | 1.1781E−03 | 7.5382E−04 | 5.6630E−04 | 3.0969E−04 | 1.5430E−04 |
| S8 | −3.3440E−01 | −4.0794E−03 | 4.5582E−03 | 1.4677E−03 | 1.3567E−03 | 7.1222E−04 | 3.2742E−04 |
| S9 | −4.9981E−01 | 9.1365E−03 | −2.6043E−03 | −1.0664E−03 | −1.1158E−03 | 1.2324E−03 | −6.5585E−06 |
| S10 | −9.3813E−01 | 8.6833E−02 | 6.0447E−03 | 1.6699E−02 | −2.6478E−03 | −5.3669E−03 | −7.9104E−03 |
| S11 | −1.4283E−00 | 1.6701E−01 | 1.1325E−01 | 9.7952E−03 | −1.8893E−02 | −1.4777E−02 | −1.9438E−04 |
| S12 | −1.1176E−00 | 2.9041E−01 | −4.0788E−02 | −1.8845E−02 | 1.3819E−02 | 6.6527E−03 | −9.6622E−04 |
| S13 | −5.0578E−00 | 1.2197E−00 | −1.0353E−01 | −4.8823E−02 | 1.1408E−02 | −1.1881E−02 | 6.6617E−03 |
| S14 | −4.2161E−00 | 8.3946E−01 | −6.3105E−02 | 1.8750E−02 | 3.7358E−02 | −3.8305E−02 | −8.0075E−03 |
| S15 | 6.9533E−00 | −8.4031E−01 | 1.3587E−01 | −3.9128E−02 | 3.7715E−02 | −4.1295E−02 | 2.0130E−02 |
| S16 | 1.6666E−00 | −2.3380E−01 | 3.9348E−01 | −9.2794E−02 | 9.0539E−03 | −1.5993E−02 | 2.0667E−03 |

TABLE 14-2

| Surface number | A18 | A20 | A22 | A24 | A26 | A28 | A30 |
|---|---|---|---|---|---|---|---|
| S1 | −4.9037E−06 | 1.8065E−06 | 0.0000E+00 | 0.0000E+00 | 0.0000E+00 | 0.0000E+00 | 0.0000E+00 |
| S2 | −7.7774E−06 | 3.4600E−06 | 0.0000E+00 | 0.0000E+00 | 0.0000E+00 | 0.0000E+00 | 0.0000E+00 |
| S3 | −1.0472E−05 | 7.0244E−06 | 0.0000E+00 | 0.0000E+00 | 0.0000E+00 | 0.0000E+00 | 0.0000E+00 |
| S4 | −1.1079E−07 | −3.9828E−06 | 0.0000E+00 | 0.0000E+00 | 0.0000E+00 | 0.0000E+00 | 0.0000E+00 |
| S5 | 1.7117E−05 | −5.9880E−07 | 0.0000E+00 | 0.0000E+00 | 0.0000E+00 | 0.0000E+00 | 0.0000E+00 |
| S6 | −1.3530E−05 | −5.0342E−06 | 0.0000E+00 | 0.0000E+00 | 0.0000E+00 | 0.0000E+00 | 0.0000E+00 |
| S7 | 5.4856E−05 | 1.7118E−05 | 0.0000E+00 | 0.0000E+00 | 0.0000E+00 | 0.0000E+00 | 0.0000E+00 |
| S8 | 9.9868E−05 | 3.8793E−05 | 0.0000E+00 | 0.0000E+00 | 0.0000E+00 | 0.0000E+00 | 0.0000E+00 |
| S9 | 1.1312E−04 | −6.2571E−05 | 0.0000E+00 | 0.0000E+00 | 0.0000E+00 | 0.0000E+00 | 0.0000E+00 |
| S10 | −2.9607E−03 | −1.1537E−03 | 0.0000E+00 | 0.0000E+00 | 0.0000E+00 | 0.0000E+00 | 0.0000E+00 |
| S11 | 4.0118E−03 | 2.0113E−03 | −4.4114E−04 | −8.5744E−04 | −3.7910E−04 | −1.8333E−05 | −1.1862E−06 |
| S12 | −4.7228E−04 | 4.9068E−04 | −1.4648E−04 | −5.8248E−04 | −3.0048E−04 | −1.3720E−05 | −8.4025E−07 |
| S13 | 3.3959E−04 | −2.8985E−03 | 5.0489E−04 | 1.0468E−05 | 9.4446E−07 | 0.0000E+00 | 0.0000E+00 |
| S14 | −4.8132E−04 | 1.8971E−03 | 1.7124E−04 | 4.3785E−05 | 4.7923E−04 | 0.0000E+00 | 0.0000E+00 |
| S15 | 7.2536E−04 | −7.8999E−03 | 2.5355E−03 | 2.0347E−03 | −3.2749E−03 | 1.6987E−03 | −4.7374E−04 |
| S16 | −3.3210E−03 | 3.4487E−03 | −2.5068E−03 | 2.9369E−03 | −2.8629E−03 | −1.2452E−04 | −1.0694E−05 |

Figure 14A:
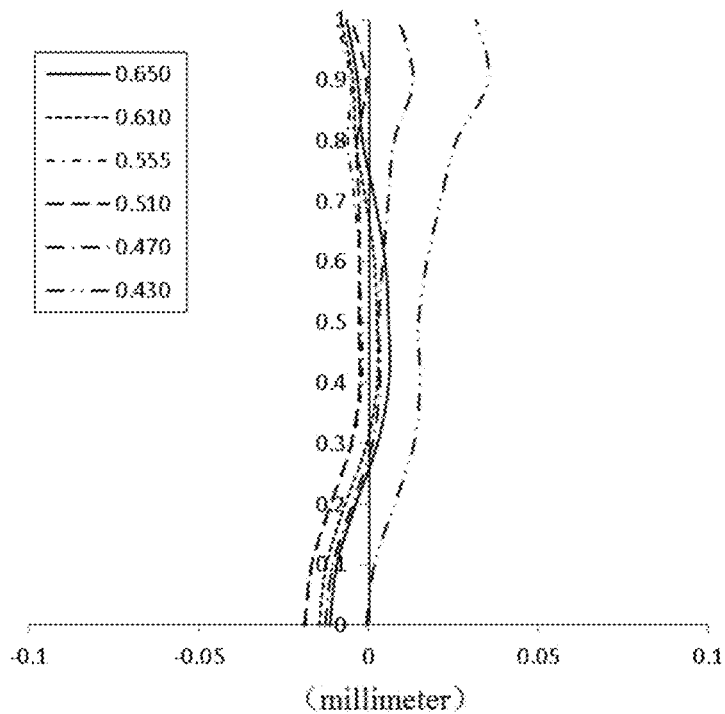
FIGS. 14A to 14C show a longitudinal aberration curve, an astigmatism curve and a lateral color curve of an optical imaging lens assembly according to embodiment 7 respectively.
Figure 14B:
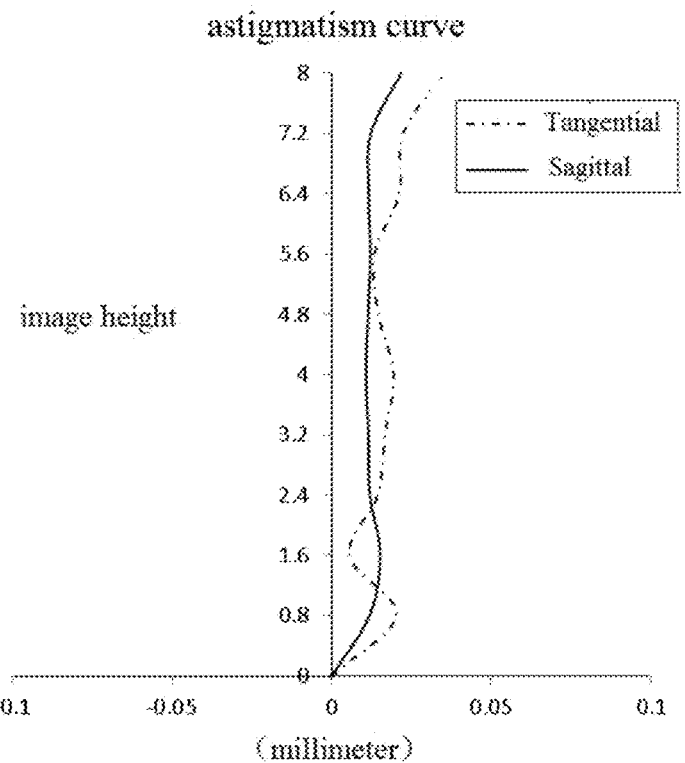
Figure 14C:
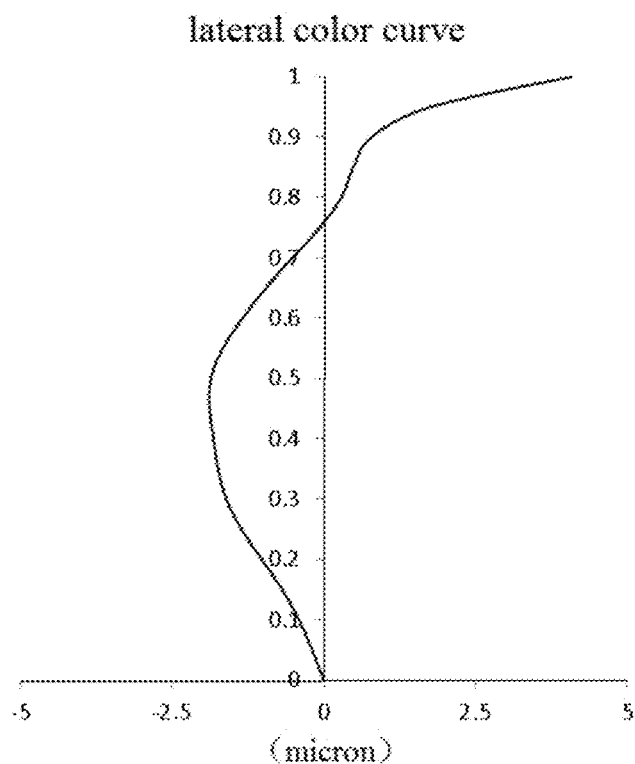

FIG. 14A shows a longitudinal aberration curve of the optical imaging lens assembly according to embodiment 7 to represent deviations of a convergence focal point after light with different wavelengths passes through the lens assembly. FIG. 14B shows an astigmatism curve of the optical imaging lens assembly according to embodiment 7 to represent a tangential image surface curvature and a sagittal image surface curvature. FIG. 14C shows a lateral color curve of the optical imaging lens assembly according to embodiment 7 to represent deviations of different image heights on the imaging surface after the light passes through the lens assembly. According to FIGS. 14A to 14C, it can be seen that the optical imaging lens assembly provided in embodiment 7 may achieve high imaging quality.

From the above, embodiment 1 to embodiment 7 meet a relationship shown in Table 15 respectively.

TABLE 15

| Conditional expression | embodiment | | | | | | |
|---|---|---|---|---|---|---|---|
| | 1 | 2 | 3 | 4 | 5 | 6 | 7 |
| TTL/ImgH | 1.11 | 1.10 | 1.09 | 1.09 | 1.12 | 1.13 | 1.13 |
| f8/R16 | 0.90 | 0.70 | 0.70 | 0.60 | 0.64 | 0.65 | 0.67 |
| f × tan(Semi-FOV)(mm) | 7.79 | 6.98 | 6.92 | 6.59 | 6.62 | 6.70 | 6.67 |
| (R6 − R5)/(R13 + R14) | 0.86 | 0.85 | 0.85 | 1.02 | 0.71 | 0.72 | 0.67 |
| R7/(R7 − R11) | 0.91 | 0.85 | 0.85 | 0.79 | 0.78 | 0.75 | 0.76 |
| T67/T78 | 0.47 | 0.50 | 0.48 | 0.39 | 0.55 | 0.52 | 0.52 |
| (f1 + f3)/(f2 + f5) | −0.65 | −0.49 | −0.53 | −0.63 | −1.05 | −1.07 | −1.12 |
| f/f6 | 0.34 | 0.34 | 0.32 | 0.25 | 0.55 | 0.56 | 0.58 |
| (R2 − R1)/(R3 − R4) | 0.50 | 0.98 | 0.99 | 1.02 | 1.28 | 1.28 | 1.22 |
| (DT51 + DT52)/R10 | 0.25 | 0.41 | 0.41 | 0.39 | 0.53 | 0.52 | 0.36 |
| ΣCT/ΣAT | 1.03 | 0.91 | 0.90 | 0.87 | 0.89 | 0.88 | 0.88 |
| f1234/f78 | −0.79 | −0.81 | −0.79 | −0.70 | −1.24 | −1.28 | −1.29 |
| ET8/(ET2 + ET7) | 0.80 | 0.87 | 0.74 | 0.74 | 0.73 | 0.79 | 0.80 |
| (DT21 + DT22)/(DT61 + DT62) | 0.58 | 0.61 | 0.61 | 0.59 | 0.58 | 0.58 | 0.58 |
| DT71/DT82 | 0.73 | 0.66 | 0.66 | 0.65 | 0.63 | 0.65 | 0.65 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis, a first lens, a second lens, a third lens, a fourth lens, a fifth lens, a sixth lens, a seventh lens and an eighth lens with refractive power respectively, wherein
    an image-side surface of the eighth lens is a convex surface;
    TTL is a distance from an object-side surface of the first lens to an imaging surface of the optical imaging lens assembly on the optical axis, ImgH is a half of a diagonal length of an effective pixel region of the optical imaging lens assembly, and TTL and ImgH meet TTL/ImgH<1.2; and
    an effective focal length f8 of the eighth lens and a curvature radius R16 of the image-side surface of the eighth lens meet 0.5<f8/R16<1.5.

2. The optical imaging lens assembly according to claim 1, wherein a curvature radius R5 of an object-side surface of the third lens, a curvature radius R6 of an image-side surface of the third lens, a curvature radius R13 of an object-side surface of the seventh lens and a curvature radius R14 of an image-side surface of the seventh lens meet 0.5<(R6−R5)/(R13+R14)<1.5.

3. The optical imaging lens assembly according to claim 1, wherein a curvature radius R7 of an object-side surface of the fourth lens and a curvature radius R11 of an object-side surface of the sixth lens meet 0.5<R7/(R7−R11)<1.0.

4. The optical imaging lens assembly according to claim 1, wherein a spacing distance T67 of the sixth lens and the seventh lens on the optical axis and a spacing distance T78 of the seventh lens and the eighth lens on the optical axis meet 0<T67/T78<0.6.

5. The optical imaging lens assembly according to claim 1, wherein an effective focal length f1 of the first lens, an effective focal length f2 of the second lens, an effective focal length f3 of the third lens and an effective focal length f5 of the fifth lens meet −1.3<(f1+f3)/(f2+f5)<−0.3.

6. The optical imaging lens assembly according to claim 1, wherein a total effective focal length f of the optical imaging lens assembly and an effective focal length f6 of the sixth lens meet 0<f/f6<1.0.

7. The optical imaging lens assembly according to claim 1, wherein a curvature radius R1 of the object-side surface of the first lens, a curvature radius R2 of an image-side surface of the first lens, a curvature radius R3 of an object-side surface of the second lens and a curvature radius R4 of an image-side surface of the second lens meet 0.3<(R2−R1)/(R3−R4)<1.3.

8. The imaging lens assembly according to claim 1, wherein a curvature radius R10 of an image-side surface of the fifth lens, a maximum effective radius DT51 of an object-side surface of the fifth lens and a maximum effective radius DT52 of the image-side surface of the fifth lens meet 0<(DT51+DT52)/R10<1.0.

9. The optical imaging lens assembly according to claim 1, wherein a combined focal length f1234 of the first lens, the second lens, the third lens and the fourth lens and a combined focal length f78 of the seventh lens and the eighth lens meet −1.5<f1234/f78<−0.5.

10. The optical imaging lens assembly according to claim 1, wherein an edge thickness ET2 of the second lens, an edge thickness ET7 of the seventh lens and an edge thickness ET8 of the eighth lens may meet 0.5<ET8/(ET2+ET7)<1.0.

11. The optical imaging lens assembly according to claim 1, wherein a maximum effective radius DT21 of an object-side surface of the second lens, a maximum effective radius DT22 of an image-side surface of the second lens, a maximum effective radius DT61 of an object-side surface of the sixth lens and a maximum effective radius DT62 of an image-side surface of the sixth lens meet $0.3<(DT21+DT22)/(DT61+DT62)<0.8$.

12. The optical imaging lens assembly according to claim 1, wherein a maximum effective radius DT71 of an object-side surface of the seventh lens and a maximum effective radius DT82 of an image-side surface of the eighth lens meet $0.3<DT71/DT82<0.8$.

13. The optical imaging lens assembly according to claim 1, wherein the fifth lens has a negative refractive power, and an image-side surface thereof is a concave surface.

14. The optical imaging lens assembly according to claim 1, wherein Semi-FOV is a half of a maximum field of view of the optical imaging lens assembly, and a total effective focal length f of the optical imaging lens assembly and Semi-FOV meet $f \times \tan(\text{Semi-FOV}) > 6.5$ mm.

15. The optical imaging lens assembly according to claim 1, wherein $\Sigma CT$ is a sum of center thicknesses of the first lens to the eighth lens on the optical axis, $\Sigma AT$ is a sum of spacing distances of any two adjacent lenses in the first lens to the eighth lens on the optical axis, and $\Sigma CT$ and $\Sigma AT$ meet $0.8<\Sigma CT/\Sigma AT<1.5$.

16. An optical imaging lens assembly, sequentially comprising, from an object side to an image side along an optical axis, a first lens, a second lens, a third lens, a fourth lens, a fifth lens, a sixth lens, a seventh lens and an eighth lens with refractive power respectively, wherein the fifth lens has a negative refractive power, and an image-side surface thereof is a concave surface;

an image-side surface of the eighth lens is a convex surface; and

TTL is a distance from an object-side surface of the first lens to an imaging surface of the optical imaging lens assembly on the optical axis, ImgH is a half of a diagonal length of an effective pixel region of the optical imaging lens assembly, and TTL and ImgH meet $TTL/ImgH<1.2$.

* * * * *